United States Patent
Miriyala

(10) Patent No.: US 10,728,288 B2
(45) Date of Patent: Jul. 28, 2020

(54) POLICY-DRIVEN WORKLOAD LAUNCHING BASED ON SOFTWARE DEFINED NETWORKING ENCRYPTION POLICIES

(71) Applicant: Juniper Networks, Inc., Sunnyvale, CA (US)

(72) Inventor: Prasad Miriyala, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1 day.

(21) Appl. No.: 16/024,412

(22) Filed: Jun. 29, 2018

(65) Prior Publication Data

US 2019/0158537 A1 May 23, 2019

Related U.S. Application Data

(63) Continuation-in-part of application No. 15/819,522, filed on Nov. 21, 2017.

(51) Int. Cl.
| | |
|---|---|
| H04L 29/06 | (2006.01) |
| G06F 9/50 | (2006.01) |
| G06F 9/54 | (2006.01) |
| G06F 21/60 | (2013.01) |
| H04L 29/08 | (2006.01) |

(52) U.S. Cl.
CPC ............ *H04L 63/20* (2013.01); *G06F 9/5077* (2013.01); *G06F 9/54* (2013.01); *G06F 21/602* (2013.01); *G06F 21/606* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 9,680,875 B2* | 6/2017 | Knjazihhin | H04L 63/20 |
| 2012/0005724 A1* | 1/2012 | Lee | H04L 63/0209 |
| | | | 726/1 |
| 2014/0033268 A1 | 1/2014 | Julisch et al. | |
| 2014/0245423 A1* | 8/2014 | Lee | H04L 63/0218 |
| | | | 726/12 |

(Continued)

FOREIGN PATENT DOCUMENTS

| | | |
|---|---|---|
| WO | 2013184846 A1 | 12/2013 |
| WO | 2017064560 A1 | 4/2017 |

OTHER PUBLICATIONS

U.S. Appl. No. 15/819,522, filed Nov. 21, 2017, Juniper Networks, Inc. (inventor: Miriyala et al.), entitled Scalable Policy Management for Virtual Networks.

(Continued)

*Primary Examiner* — Henry Tsang
(74) *Attorney, Agent, or Firm* — Shumaker & Sieffert, P.A.

(57) ABSTRACT

Techniques are disclosed for implementing scalable policies across a plurality of categories that support application workloads. In one example, the policy is a security policy that indicates which types of virtualized application workloads are required to communicate with encryption and groups computing devices into zones that communicate via respective tunnels configured to carry encrypted communication. An orchestration engine selects a computing device based on the zones fined in the security policy to ensure that the virtualized application workloads requiring encrypted communication communicate via tunnels configured to carry encrypted communication.

16 Claims, 8 Drawing Sheets

(56) References Cited

U.S. PATENT DOCUMENTS

| | | | |
|---|---|---|---|
| 2015/0081893 | A1 | 3/2015 | Chadwell et al. |
| 2015/0124809 | A1 | 5/2015 | Edsall et al. |
| 2016/0261486 | A1 | 9/2016 | Fang et al. |
| 2018/0109450 | A1* | 4/2018 | Filsfils .................. H04L 45/74 |
| 2018/0316729 | A1* | 11/2018 | Chauvet ............ G05B 19/4185 |
| 2019/0014124 | A1* | 1/2019 | Reddy .................. H04L 63/108 |
| 2019/0158541 | A1 | 5/2019 | Miriyala et al. |

OTHER PUBLICATIONS

Sangli et al., "BGP Extended Communities Attribute," RFC 4360, Network Working Group, Feb. 2006, 12 pp.

Sajassi et al., "BGP MPLS-Based Ethernet VPN," RFC 7432, Internet Engineering Task Force (IETF), Feb. 2015, 56 pp.

"Service group and Service Object support," OpenStack Neutron Team, OpenStack Cloud Software, last updated Mar. 17, 2015, accessed from http://specs.openstack.org/openstack/neutron-specs/specs/kilo/service-group.html, 7 pp.

"Juniper / Contrail-specs / fw_security_enhancements.md," GitHub, May 20, 2017, accessed from https://github.com/Juniper/contrail-specs/blob/master/fw_security_enhancements.md, 10 pp.

"Firewall as a Service API 2.0," OpenStack Neutron Team, OpenStack Cloud Software, last updated Sep. 21, 2017, accessed from https://specs.openstack.org/openstack/neutron-specs/specs/newton/fwaas-api-2.0.html, 31 pp.

"3.2 Rules Headers," SNORTUsers Manual 2.9.11, Applicant points out, in accordance with MPEP 609.04(a), that the year of publication, 2008, is sufficiently earlier than the effective U.S. filing date, 2017, so that the particular month of publication is not an issue, accessed from http://manual-snort-org.s3-website-us-east-1.amazonaws.com/node29.html#SECTION00421000000000000000, 4 pp.

Extended European Search Report from counterpart European Application No. 18207324.7, dated Apr. 15, 2019, 11 pp.

Nutanix, Apr. 9, 2019, available at https://www.nutanix.com/blog/building-things-people-like (last accessed Aug. 22, 2019), 4 pp.

"ClearSky Takes Primary Storage 'to the Cloud'" A DeepStorage Technology Validation Report, DeepStorage, LLC Aug. 31, 2015, 15 pp.

"Container Orchestration Services" Mesosphere, Mar. 24, 2016, available at www.mesosphere.com > solutions > container-orchestration (last accessed Aug. 22, 2019), 7 pp.

"Federation" The Kubernetes Authors, Mar. 12, 2019, available at https://kubernetes.io/docs/tasks/federation/ (last accessed Aug. 22, 2019) 7 pp.

"Hyper-Converged Kubernetes Architecture: ROBIN—Databases, Big Data" ROBIN, May 28, 2019, available at https://robin-io/product/architecture/ (last accessed Aug. 22, 2019), 4 pp.

"Hyperconverged Kubernetes" White Paper, ROBIN, Jan. 28, 2019, available at https://robin.io/portfolio/hyperconverged-kubernetes-whitepaper/ (last accessed Aug. 22, 2019), 15 pp.

"Marathon Placement Constraints" Mesosphere DC/OS Documentation, Mesosphere, Oct. 25, 2018, available at https://docs.d2iq.com/mesosphere/dcos/1.12/deploying-services/marathon-constraints/ (last accessed Aug. 22, 2019), 2 pp.

"Multi-Cloud" NooBaa, Apr. 28, 2018, available at https://www.noobaa.io/multicloud (last accessed Aug. 22, 2019), 7 pp.

"Open-Source, Cloud-Native Storage for Kubernetes" Rook Authors, Jun. 27, 2017, available at https://rook.io (last accessed Aug. 22, 2019), 6 pp.

"Openly serious about storage" REX-Ray, Feb. 28, 2018, available at https://rexray.readthedocs.io/en/stable/ (last accessed Aug. 22, 2019), 5 pp.

"OpenStack Docs: Placement Usage" The OpenStack Project, Mar. 18, 2019, available at https://docs.openstack.org/placement/latest/usage/index.html (last accessed Aug. 22, 2019), 3 pp.

"OpenStack Docs: Stein Series Release Notes" The OpenStack Project, Apr. 11, 2019, available at https://docs.openstack.org/releasenotes/placement/stein.html# (last accessed Aug. 22, 2019), 4 pp.

"OpenStack Stein—OpenStack is open source software for creating private and public clouds." The OpenStack Project, Apr. 10, 2019, available at https://www.openstack.org/software/stein/ (last accessed Aug. 22, 2019), 34 pp.

"Portworx features & pricing: Container storage, HA, security" The Portworx Platform, Dec. 5, 2018, available at https://portworx.com/products/features/ (last accessed Aug. 22, 2019), 8 pp.

"REX-Ray" Rex-Ray, Apr. 23, 2018, available at https://rexray.io (last accessed Aug. 22, 2019), 12 pp.

"Run Kubernetes Everywhere" Container Orchestration, Kubernetes Management, Rancher.com (last accessed Aug. 22, 2019), May 1, 2019, 10 pp.

"Scality Ring Multi-Cloud Data Storage at Petabyte Scale" Scality Ring 7.4 Data Sheet, Scality, Jun. 5, 2018, 4 pp.

"What is Multi Cloud?" Scality, Dec. 2, 2017, available at https://www.scality.com/topics/what-is-multi-cloud/ (last accessed Aug. 22, 2019), 10 pp.

Callahan, "Introducing the Zenko Multi-Cloud Data Controller—Scality" Scality, Jul. 12, 2017, available at https://www.scality.com/introducing-zenko-multi-cloud-data-controller/ (last accessed Aug. 22, 2019), 10 pp.

Droms, R. "Dynamic Host Configuration Protocol" Network Working Group, RFC 2131, Mar. 1997, 45 pp.

Enns et al. "Network Configuration Protocol (NETCONF)" Internet Engineering Task Force (IETF), RFC 6241, Jun. 2011, 113 pp.

Hölzle et al. "Introducing Anthos: An entirely new platform for managing applications in today's multi-cloud world" Google, Inc., Apr. 9, 2019, available at https://cloud.google.com/blog/topics/hybrid-cloud/new-platform-for-managing-applications-in-todays-multi-cloud-world, (last accessed Aug. 22, 2019), 2 pp.

Meyer, "Red Hat Squeezes OpenStack, OpenShift Closer Together" SDxCentral, Nov. 13, 2018, available at https://www.sdxcentral.com/articles/news/red-hat-squeezes-openstack-openshift-closer-together/2018/11/ (last accessed Aug. 22, 2019), 3 pp.

Mockapetris, P. "Domain Names—Concepts and Facilities" Network Working Group, RFC 1034, Nov. 1987, 55 pp.

Mockapetris, P. "Domain Names—Implementation and Specification" Network Working Group, RFC 1035, Nov. 1987, 55 pp.

Rehman et al. "Kubernetes Federation Evolution" The Kubernetes Authors, Dec. 12, 2018, available at https://kubernetes.io/blog/2018/12/12/kubernetes.federation-evolution/ (last accessed Aug. 22, 2019), 8 pp.

U.S. Appl. No. 15/476,136, Juniper Networks, Inc. (inventor: Mehta et al.), entitled "Session-Based Traffic Statistics Logging for Virtual Routers", filed Mar. 31, 2017.

U.S. Appl. No. 16/118,107, filed Aug. 30, 2018 entitled "Multiple Virtual Network Interface Support for Virtual Execution Elements", Juniper Networks, Inc. (inventor:Rao et al.).

U.S. Appl. No. 16/355,289, filed Mar. 15, 2019 entitled "Storage Volume Replication Across Multiple Data Centers", Juniper Networks, Inc. (inventor: Echegaray et al.).

Response filed Nov. 22, 2019 to the Extended European Search Report from counterpart European Application No. 18207324.7, dated Apr. 15, 2019, 18 pp.

* cited by examiner

POLICY-DRIVEN WORKLOAD LAUNCHING BASED ON SOFTWARE DEFINED NETWORKING ENCRYPTION POLICIES

This application is a continuation-in-part (CIP) of U.S. application Ser. No. 15/819,522, filed Nov. 21, 2017, the entire content of which is incorporated herein by reference.

TECHNICAL FIELD

This disclosure generally relates to computer networks, and more specifically, to distributed applications.

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices.

Virtualization with large scale data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the infrastructure. As physical computing resources become fungible resources, such as in a cloud-based computing environment, provisioning and management of the compute infrastructure becomes easier. Thus, enterprise IT staff often prefer virtualized compute clusters in data centers for their management advantages in addition to the efficiency and increased return on investment (ROI) that virtualization provides.

SUMMARY

In general, the disclosure describes techniques for a policy framework to support application of encryption policies for controlling network traffic among virtualized application workloads executing within cloud-based virtualized computing environments. The computing environment includes computing devices such as servers that launch instances of the virtualized application workloads. Certain types of virtualized application workloads, such as financial applications, are designated to have encrypted communications to or from these application workloads. However, not all computing devices are configured to efficiently provide the desired level of encryption.

In this disclosure, one or more examples of high-level orchestration engines for cloud-based systems are exposed to information that the orchestration engines use to determine which ones of the computing devices are to execute instances of virtualized application workloads requiring enhanced-encryption. An orchestration engine for a virtualized computing environment may be configured to specify a state of a network across which the computing devices communicate, and a controller (e.g., software defined networking (SDN) controller) may be configured to manage the network such that the actual state of the network matches the state specified by the orchestration engine.

For example, the SDN controller configures a network to form tunnels between computing devices. The tunnels are within the control of the SDN controller, and information indicating the connections of the tunnels may not be available or accessible by the orchestration engine. While the SDN controller controls the tunnels between computing devices, the orchestration engine is configured to determine on which computing device a particular virtualized application workload is to execute, but without knowledge of the tunnels between computing devices, and particularly without knowledge of the tunnels specifically configured for carrying encrypted communication.

In one or more examples, the controller may provide security policy information indicating types of an application workloads (e.g., including information specifying a particular application workload) that must have encrypted communication (e.g., encrypted communication to, encrypted communications from, or encrypted communications to and from). The controller may also expose information to the orchestration engine indicating computing devices that are included as part of zones defined to carry encrypted communication. The orchestration engine may select a computing device and deploy an application workload to the selected computing device based on the security policy, including information indicating which computing devices are included as part of zones defined to carry encrypted communication. The SDN controller can then ensure that the encrypted communication travel along tunnels formed with the computing devices belonging in the zone.

In this manner, an administrator can define security policies that indicate which types of application workloads require encrypted communication and ensure that those application workloads of that type are deployed to servers having the encryption capabilities without needing to force encryption on all communication between all computing devices. For instance, the techniques described in this disclosure ensure that encryption is performed on an as-needed basis such that tunnels between computing devices that execute the application workloads that require encrypted communication carry encrypted communication and tunnels between computing devices that execute application workloads that do not require encrypted communication or do not require enhanced encryption do not have to carry encrypted or enhanced encrypted communication.

In one example, this disclosure describes a method comprising configuring, by a software defined networking (SDN) controller, a network to form tunnels between computing devices in accordance with a security policy. The security policy defines one or more types of virtualized application workloads that require encrypted communications and groups the computing devices into one or more zones that communicate via a respective subset of tunnels. At least one of the subsets of the tunnels is configured to carry encrypted communication, and each of the computing devices provides an execution environment for a plurality of virtualized application workloads. The method also includes responsive to a request to execute a virtualized application workload, accessing, by an orchestration engine, the security policy implemented by the SDN controller, determining, by the orchestration engine, that the virtualized application workload requires encrypted communication based on the security policy, selecting, by the orchestration engine, a computing device from the computing devices in one of the zones defined in the security policy for communicating via at least one tunnel that is configured to carry encrypted communication, and deploying, by the orchestration engine, the application workload to the selected computing device.

In one example, this disclosure describes a system comprising a software defined networking (SDN) controller and an orchestration engine. The SDN controller is configured to configure a network to form tunnels between computing devices in accordance with a security policy. The security policy defines one or more types of virtualized application workloads that require encrypted communications and groups the computing devices into one or more zones that communicate via a respective subset of tunnels. At least one of the subsets of the tunnels is configured to carry encrypted communication, and each of the computing devices provides an execution environment for a plurality of virtualized application workloads. The orchestration engine is configured to access the security policy implemented by the SDN controller, responsive to a request to execute a virtualized application workload, determine that the virtualized application workload requires encrypted communication based on the security policy, select a computing device from the computing devices in one of the zones defined in the security policy for communicating via at least one tunnel that is configured to carry encrypted communication, and deploy the application workload to the selected computing device.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
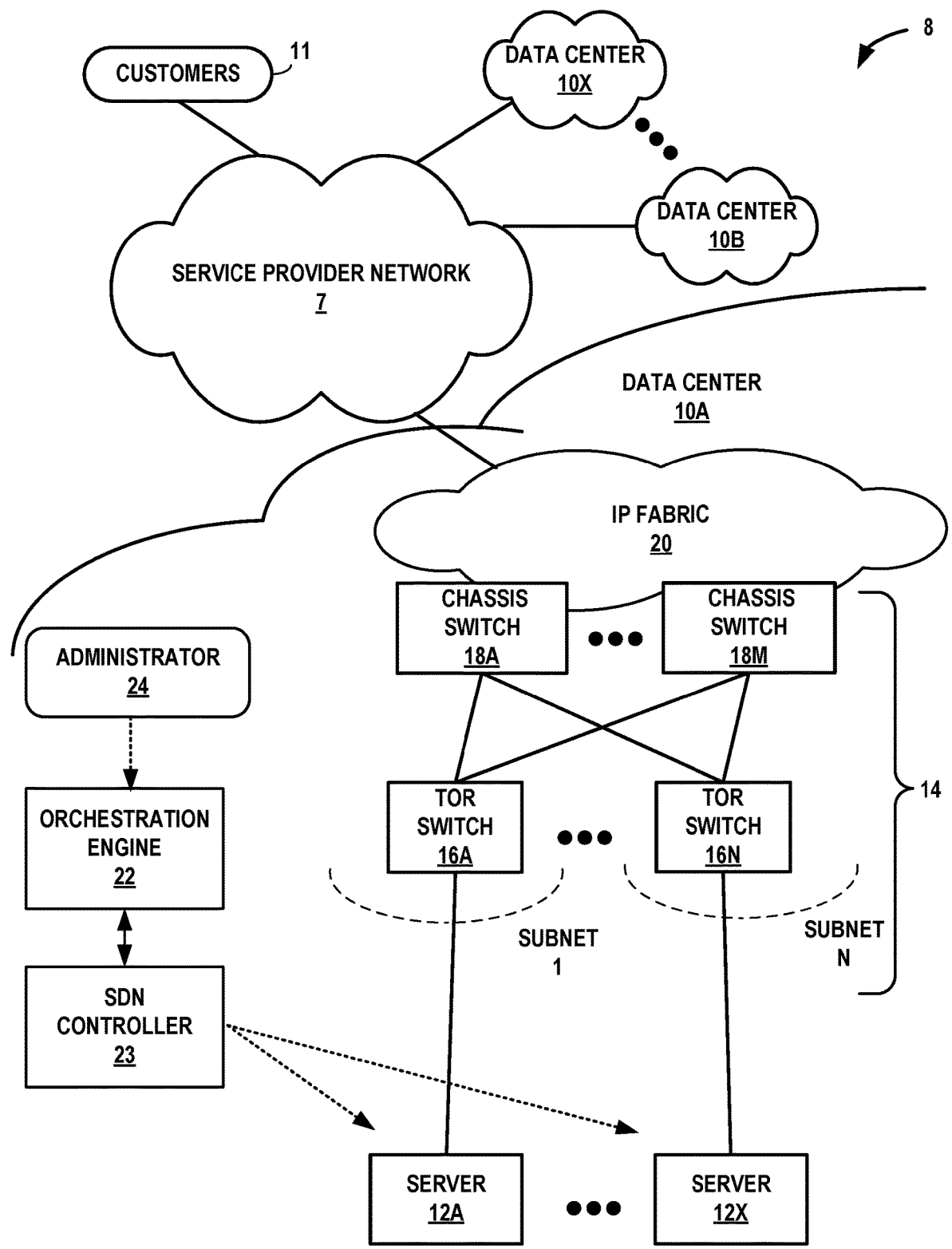
FIG. 1 is a block diagram illustrating an example network having a data center in which examples of the techniques described herein may be implemented.

FIG. 1 is a block diagram illustrating an example network system in which examples of the techniques described herein may be implemented. Network system 2 in the example of FIG. 1 includes data centers 10A-10X (collectively, "data centers 10") interconnected with one another and with customer networks associated with customers 11 via a service provider network 7. In general, each data center 10 provides an operating environment for applications and services for customers 11 coupled to the data center by service provider network 7. Data centers 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, each data center 10 may represent one of many geographically distributed network data centers. As illustrated in the example of FIG. 1, each of data centers 10 may be a facility that provides network services for customers 11. Customers 11 may be collective categories such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, each of data centers 10 may be individual network servers, network peers, or otherwise.

In this example, each of data centers 10 includes a set of storage systems and application servers 12A-12X (herein, "servers 12") interconnected via high-speed switch fabric 14 provided by one or more tiers of physical network switches and routers. Switch fabric 14 is provided by a set of interconnected top-of-rack (TOR) switches 16A-16BN (collectively, "TOR switches 16") coupled to a distribution layer of chassis switches 18A-18M (collectively, "chassis switches 18"). Although not shown, each of data centers 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 7. Chassis switches 18 aggregate traffic flows and provides high-speed connectivity between TOR switches 16. TOR switches 16 may be network devices that provide layer two (e.g., MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data centers 10 and customers 11 by service provider network 7.

Software-Defined Network ("SDN") controller 23 provides a logically, and in some cases, physically centralized controller for facilitating operation of one or more virtual networks within each of data centers 10, such as data center 10A, in accordance with one or more examples of this disclosure. In some examples, SDN controller 23 may operate in response to configuration input received from network administrator 24. Additional information regarding SDN controller 23 operating in conjunction with other devices of data center 10A or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

In some examples, orchestration engine 22 manages application-layer functions of data center 10 such as managing compute, storage, networking, and application resources executing on servers 12. For example, orchestration engine 22 may attach virtual machines (VMs) to a tenant's virtual network and generally manage the launching, migration and deconstruction of the VMs as needed. Each virtual machine may be referred to as a virtualized application workload (or just application workload) and generally represents a virtualized execution element, such as a VM or a container. Orchestration engine 22 may connect a tenant's virtual network to some external network, e.g. the Internet or a VPN. Orchestration engine 22 may implement a security policy across a group of VMs or to the boundary of a tenant's network. Orchestration engine 22 may deploy a network service (e.g. a load balancer) in a tenant's virtual network.

In some examples, SDN controller 23 is a lower-level controller tasked with managing the network and networking services of data center 10A and, in particular, switch fabric 14 that provides connectivity between servers 12. SDN controller 23 utilizes a set of communication protocols to configured and control routing and switching elements of switch fabric 14 to create an overly network, which generally refers to a set of tunnels for transporting packets between servers 12. Accordingly, SDN controller 23 may be configured to configure a network (e.g., switch fabric 14, IP fabric 20, etc.) to form tunnels between servers 12 and TORs 16. Servers 12 and TORs 16 are examples of computing devices.

One such communication protocol to configure the network (e.g., switch fabric 14, IP fabric 20, etc.) may include a messaging protocol such as XMPP, for example. For example, SDN controller 23 implements high-level requests from orchestration engine 22 by configuring physical switches, e.g. TOR switches 16, chassis switches 18, and switch fabric 14; physical routers; physical service nodes such as firewalls and load balancers; and virtual services such as virtual firewalls in a VM. SDN controller 23 maintains routing, networking, and configuration information within a state database. SDN controller 23 communicates a suitable subset of the routing information and configuration information from the state database to virtual router (VR) agents on each of servers 16A-16N.

Typically, the traffic between any two network devices, such as between network devices within IP fabric 20 (not shown) or between servers 12 and customers 11 or between servers 12, for example, can traverse the physical network using many different paths. A packet flow (or "flow") can be defined by the five values used in a header of a packet, or "five-tuple," i.e., the protocol, Source IP address, Destination IP address, Source port and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

In some examples, each of data centers 10 may have a need to implement different policies within different computing environments according to the needs of the particular environment. For example, a development environment, a staging environment, and a production environment of data center 10A may each have different requirements for various policies for the network, such as firewall, network, application, or global policies. Furthermore, multiple data centers 10 across different geographic locations may implement different policies within each of their respective internal computing environments due to different customer requirements, networking resources and configurations, etc. If each computing environment within each of data centers 10 were to independently manage its own policies, an administrator may have difficulty ensuring that each policy meets security, reliability, and quality requirements. Furthermore, if each computing environment within each data center were to independently manage its own policies, upgrading one or more of the policies across the multiple data centers may become cumbersome or unmanageable.

For example, each application workload (i.e., each instance of a virtual machine or container launched on a given one of servers 12) may have security requirements such as requirements for encrypted communication within data center 10A and, in particular, using switch fabric 14 as established and configured by SDN controller 23. As one example, an application workload executing on server 12 may be required to transmit encrypted communication when transmitting to a database executing on server 12X for storage. As another example, an application workload executing on one of servers 12 may be required to receive encrypted communication, such as inputs provided by a user in a web application. As yet another example, some application workloads may require to both receive encrypted communication and transmit encrypted communication.

Moreover, often the particular requirements of a given application workload are not known until the corresponding virtual machine/container is launched via orchestration engine 22, which may be generally unaware of the particular characteristics of the network (tunnels) and encryption zones grouped (e.g., established) by SDN controller 23 for handling communications across switch fabric 14. In particular, absent the techniques described herein, orchestration engine 22 may be unaware of, and unable to determine, which servers 12 are capable of communication across switch fabric 14 via encrypted tunnels of the network and, for example, within which security zones of the network each of servers 12 may operate.

In accordance with the techniques of the disclosure, network system 8 implements a scalable, multi-dimensional policy framework to support flexible application of policies for controlling network traffic among application workloads executing within one or more computing environments for data centers 10 that may be categorized along multiple different dimensions. Such categories may include applications, deployments, application tiers, geographic sites, virtual networks, virtual machines, interfaces, projects, security requirements, quality requirements, physical devices, such as routers or switches, users, or compliance requirements, for example. One example of the security requirements is encrypted communication. Each type of category represents a dimension for application workloads that generate or consume network traffic of data centers 10.

As an example, the administrator may define a set of network policies for managing network infrastructure, including switch fabric 14 and the communication tunnels, via SDN controller 23. Each policy may be a data structure that includes a plurality of categories used to define the policy. One example of a policy is a security policy that indicates that communication with a type of application is to be encrypted using enhanced-encryption techniques and, therefore, requires SDN controller 23 to configure certain encryption-based tunnels as part of the network spanning switch fabric 14 or even to create certain zones within the network infrastructure, where each zone provides ingress and egress for untunnels having a certain level of encryption (e.g., no encryption, high encryption, inbound encryption only, outbound encryption only).

For example, SDN controller 23 may assign different sets of zones that each include one or more computing device (e.g., one or more of servers 12) for instance to group computing devices into zones. The security policy may group the computing devices into one or more zones that communicate via a subset of tunnels configured to carry encrypted communication. SDN controller 23 may identify the sets of zones in the security policy. As an example, SDN controller 23 may assign a first set of zones that include a first set of computing devices within which encrypted communication is carried in the tunnels. For instance, the first set of computing devices form endpoint computing devices for a first subset of tunnels that SDN controller 23 configured to carry encrypted communication. SDN controller 23 may assign a second set of zones that include a second set of computing devices within which other communication (e.g., unencrypted or not enhanced encrypted) communication is carried in the tunnels. For instance, the second set of computing devices form endpoint computing devices for a second subset of the tunnels that SDN controller 23 configured to not require carrying encrypted communication.

SDN controller 23 may store the network security policy in its local memory or some other memory of data center 10A. In this manner, SDN controller 23 may configure a network (e.g., switch fabric 14) to form tunnels between computing devices (e.g., servers 12) to implement a security policy. For example, SDN controller 23 configures encrypted tunnels, which are a subset of all of the tunnels, between computing devices that reside in SDN controller 23 assigned zones (e.g., groups of the computing devices into zones) for computing devices to carry encrypted communication. SDN controller 23 also configures unencrypted tunnels, which are another subset of all of the tunnels, between computing devices that reside in SDN controller 23 assigned zones for computing device that are not required to carry encrypted communication.

The security policy defines types of virtualized application workloads (including, in some examples, information specifying a particular application workload) that require encrypted communication. Orchestration engine 22 uses the security policy information such as types of virtualized application workloads that require encrypted communication and zones of the computing devices defined in the security policy for communicating via a tunnel of the subset of tunnels configured to carry encrypted communication to select a computing device on which the virtualized application workload is to be deployed (e.g., launched).

In one or more examples, SDN controller 23 exposes the security policy to orchestration engine 22, e.g., at the time a given instance is to be launched, so that orchestration engine 22 can retrieve and access the security policy. Based on exposure to the underlaying network security policy, orchestration engine 22 may advantageously determine which servers 12 are to execute the application. That is, by exposing underlaying network-level security policies used by SDN controller 23 to configure switch fabric 14 and the communication network, high-level orchestration engine may achieve improved ability to launch workload applications on servers 12 having appropriate connectivity, via the tunnels, across the data center. As described in more detail below, a policy agent executing on respective severs 12 may ensure that the communications are being encrypted in accordance with the security policy.

To the extent that orchestration engine 22 is exposed to the underlying security policy, orchestration engine 22 may not have access to information specifying the tunnels that SDN controller 23 formed as part of the network to implement the security policy. For example, orchestration engine 22 may retrieve information indicating types of application workloads requiring enhanced encryption and retrieve information indicating which ones of servers 12 provide enhanced encryption. However, orchestration engine 22 may be unaware of the specific tunnels under control of SDN controller 23 on which the encrypted communication travels between servers 12. In this way, orchestration engine 22 may be able to select one of servers 12 on which an application workload is to execute based on the security policy indicating enhanced encryption without necessarily needing to select the one of servers 12 based on tunnels formed with the selected one of servers 12 being one of the endpoints. Rather, SDN controller 23 may be configured to control and maintain the tunnels. Accordingly, orchestration engine 22 may select the computing device (e.g., one of servers 12) on which the application workload is to launch (e.g., execute), and SDN controller 23 may ensure that there are tunnels to provide encrypted communication to implement the security policy.

There may be various ways in which orchestration engine 22 retrieves the security policy from underlying SDN controller 23. As one example, administrator 24 installs a software plug-in for orchestration engine 22, where the plug-in provides an SDN interface that allows orchestration engine 22 to retrieve the security policy from SDN controller 23 even though the orchestration engine and the SDN controller 23 may generally operate at different levels of network control in a cloud-based environment and may be provided by different vendors. However, techniques in addition to or different than the use of a plug-in are possible to allow orchestration engine 22 to access information from SDN controller 23.

In some examples, the policy framework described herein permits the administrator to tag objects that execute or otherwise enable application workloads with specific dimensions across multiple levels. As described herein, a "tag" refers to a data structure that provides information to categorize an object according to a particular value or set of values. In some examples, the tag comprises a key/value pair, wherein the key describes a category of the object, and the value provides a descriptor for the category. As an example, where tag comprises a first key/value pair, the key of the tag is an "application," and the value associated with the key is a "finance" application. Example levels (e.g., example categories) of such objects include a global environment level, a project level, a virtual network level, a virtual machine level, and an interface level. In one example, tags map security requirements for the objects. Tags may be predefined (e.g., such as a tag for an application, deployment, application tier, or geographic site), or may be implicitly assigned during provisioning (e.g., such as a tag describing infrastructure, a rack, cluster, or data center which is provisioned to support the application). In some examples, multiple tags are applied to a single object (e.g., an "application" and "geographic site" tag may be applied to a single virtual machine), but the object may only have a single tag per type and/or category. In further examples, a user may define "labels" to be used as keys for the key/value pairs of tags such that the user may customize or create his or her own categories for tagging objects. Furthermore, as used herein, "tagging" an object refers to categorizing the object in a category specified by a tag included in a policy rule.

Policies may then be expressed along multiple dimensions in terms of tags corresponding to categories to which the tagged objects belong. Distributed policy agents executing on computing devices that host the application workloads may then apply the policies to tagged objects that are members of categories to allow or deny a traffic flow between the tagged objects tagged with one or more categories for one or more dimensions. At least in some cases, the policy agents apply the policies at the interface level of one or more virtual machines to permit or block network traffic flowing to and/or from interfaces of the one or more virtual machines.

In some examples, an extension of Border Gateway Protocol (BGP) is described for communicating the policy framework between categories. For example, a policy agent may receive from a policy controller a BGP message that includes an extended community specifying one or more policy rules, each policy rule including one or more tags that include one or more key/value pairs corresponding to categories that include the tagged objects. Further, each policy rule of the one or more policy rules may specify whether to permit or block network traffic between objects tagged by the one or more tags. Additional information with respect to the implementation of BGP extended communities is described in "BGP Extended Communities Attribute," RFC 4360, Internet Engineering Task Force (IETF), February 2006, available at https://tools.ietf.org/rfc/rfc4360, the entire contents of which is incorporated herein by reference. Thus, the techniques of the disclosure may allow for scalable deployment of policies across different environments within a plurality of data centers 10. Further, the techniques of the disclosure may reduce the complexity and simplify management of such policies within the plurality of data centers 10.

Another example of a tag is information indicating which ones of the computing devices are configured to provide enhanced encryption. For instance, each one of servers 12A-12N (which are examples of computing devices) may be configured to provide some level of encryption. However, certain ones of servers 12A-12N may be configured to provide a higher degree of encryption relative to other ones of servers 12A-12N. The servers that provide the enhanced encryption are referred to as encrypt cluster of servers or encrypt cluster of computing devices.

For example, SDN controller 23 may form security zones that include one or more of servers 12 that are capable of providing enhanced encryption, and one or more of servers 12 that are not capable of providing enhanced encryption. For instance, the security policy defined by SDN controller 23 groups servers 12 into one or more zones that communicate via respective subset of tunnels of the total tunnels, where the subset of tunnels is configured to carry encrypted communication. The servers in the security zones that are capable of providing enhanced encryption are referred to as encrypt cluster of computing devices. These security zones are not necessarily physically separate zones, but rather logical zones used to differentiate between servers 12 that provide enhanced encryption and those that do not. SDN controller 23 uses the information indicating which servers 12 belong in which security zones to configure the network (e.g., switch fabric 14) to form the tunnels. For example, SDN controller 23 may assign a first set of zones within which encrypted communication is carried in the tunnels, and assign a second set of zones within which other communication (e.g., unencrypted or encrypted but not with enhanced encryption) is carried in tunnels.

As one example, each one of servers 12B-12N may be configured to perform encryption in accordance with the Triple Data Encryption Standard (DES) algorithm, and server 12A may be configured to perform encryption in accordance with the Advanced Encryption Standard (AES). In this example, server 12A is configured to provide a higher level of encryption using AES, as compared to servers 12B-12N. For instance, server 12A may have a tag with key as server, and value as enhanced-encryption. In this disclosure, higher level of encryption generally means encrypting communication using a more heavy-duty encryption technique that renders the communication less susceptible to being hacked and decrypted by an unauthorized party as compared to other types of encryption.

As described above, SDN controller 23 may implement a security policy that indicates whether communication with a type of application workload is to be encrypted. As one example, the security policy may reference the application workload tags (e.g., tag identifiers (IDs)), and indicate that types of application workloads having a particular tag are to receive encrypted communication, output encrypted communication, or receive and output encrypted communication. Administrator 24 may define the tag key and values for the application workload tags (e.g., finance as a tag key). Although workload tags are described as the mechanism used by the security policy to indicate which types of the application workloads are required to have encrypted communication, the techniques are not so limited. Any mechanism to indicate that communication with an application workload is required to be encrypted may be utilized, and tags is one example way in which to a security policy can indicate that communication with an application workload of the application workload type having the tag is required to be encrypted.

In some examples, SDN controller 23 may tag a particular application workload and indicate that this application workload requires encryption. Tagging of a particular application workload to indicate that the application workload requires encryption is one example way in which SDN controller 23 may define, in the security policy, types of application workloads that require encryption. As another example, SDN controller may tag types of application workloads (e.g., key value of finance). The security policy may define that application workloads having the particular tag (e.g., all application workloads having key value of finance) are to have encrypted communications.

Orchestration engine 22 may access the security policy to determine which application workloads require encrypted communication, and access data designating which ones of the computing devices (e.g., servers 12A-12N) are encryption-enhanced (e.g., the tags of servers 12A-12N that indicate whether the server is encryption-enhanced). Orchestration engine 22 may then select one or more of the encryption-enhanced computing devices to execute an application workload needing the enhanced encrypted communication. Orchestration engine 22 may then deploy the application workload to the selected computing device. The selected computing device is an endpoint of one of the tunnels formed by SDN controller 23 to implement the security policy (e.g., endpoint of one of the tunnels that is for carrying encrypted communication). The encryption may be performed by fixed-function hardware encryption circuits, but the techniques are not so limited.

As an example, one security policy indicates that application workloads for finance are to receive and transmit encrypted communication. Another security policy indicates that application workloads for games do not need to receive and transmit encrypted communication. Another security policy indicates that application workloads that transmit to a particular database are to transmit encrypted communication, but do not need to receive encrypted communication, and so forth.

In this example, orchestration engine 22 may access the security policies and access information that indicates which ones of the computing devices are encryption-enhanced computing devices (e.g., which ones are part of the encrypt cluster of computing devices). Orchestration engine 22 may then select one or more of the computing devices based on the security policy, information that indicates which ones of the computing devices are encryption-enhanced, and the application workloads that are to be deployed.

For instance, if a finance workload is to be deployed, orchestration engine 22 may determine, based on the accessed security policy, that the application workload is to receive and transmit encrypted communication. Orchestration engine 22 may then select server 12A because, in this example, server 12A is encryption-enhanced, and cause the finance workload to deploy on server 12A. Sever 12A may encrypt any communication that is to be transmitted to the finance workload, and encrypt any communication that the finance workload outputs.

In this way, orchestration engine 22 can determine on which computing devices to deploy workload applications to ensure that the security policy is implemented. For example, administrator 24 defines the security policy well before any workload needs to execute. Therefore, orchestration engine 22 can now access the security policy to determine on which ones of servers 12 workload applications that require encryption are to execute.

As indicated above, in techniques described in this disclosure, orchestration engine 22 accesses a security policy implemented by SDN controller 23 for a plurality of computing devices that each provide an execution environment for application workloads. In one example, the security policy indicates that communications with a type of application workload requires encryption. For example, SDN controller 23 may assign tags, as defined by administrator 24, to one or more types of the application workloads that indicate whether respective types of application workloads require encrypted communication. In this example, the security policy indicates that communications with the one or more types of application workloads having the tags requires encryption.

In some examples, SDN controller 23 may also assign tags to one or more of the plurality of communication devices that designate the one or more of the plurality of communication devices as encryption-enhanced computing devices (e.g., computing devices configured to provide a higher-level of encryption as compared to other computing devices). These tags may be data designating one or more of the plurality of computing devices as encryption-enhanced computing devices. Orchestration engine 22 selects a computing device based on the tag that indicates that the computing device is an encryption-enhanced computing device to execute the application workload indicated in the security policy. Orchestration engine 22 deploys the application workload to the selected computing device.

As described in more detail below, in some examples, the security policy is a data structure that includes a plurality of fields. One of the fields indicates that encryption is required for the types of application workloads identified in the security policy. One of the fields indicates the type of application workload (e.g., a tag of the application workload) of the workload application that is be executed. In techniques described in this disclosure, orchestration engine 22 is able to access this data structure that indicates the security policy (e.g., by executing a plug-in that provides orchestration engine 22 access to information from SDN controller 23). Orchestration engine 22 parses the security policy to determine whether application workloads require encryption or not. Orchestration engine 22 also accesses tags, from SDN controller 23, that indicate which ones of the computing devices are designated as encryption-enhanced computing devices. Orchestration engine 22 deploys the application workload that requires encryption, as indicated by the security policy, to one of encryption-enhanced computing devices as indicated by the tags indicating which ones of the computing devices are encryption-enhanced computing devices.

In some techniques, orchestration engine 22 determines which servers 12A-12N execute application workloads based on existing scheduling algorithms, which typically deploy application workloads based on a server's load or central processing unit (CPU), memory, and some networking parameters, or simply selects servers in a round-robin fashion. However, these techniques fail to account of security policies that define whether communication is to be encrypted in selecting servers on which application workloads execute.

In some techniques, SDN controller 23 may cause all communication to be encrypted to ensure that communication that is required to be encrypted is encrypted, but at the cost of encrypting communication that is not necessarily required to be encrypted. Such techniques may be inefficient for various reasons. For instance, only a subset of servers 12A-12N may be encryption-enhanced, and therefore, by encrypting all communication, many severs 12A-12N may remain idle, while only the subset of servers 12A-12N execute all application workloads.

Some techniques may define a security policy that indicates encryption such that all endpoint workloads (e.g., application workloads executing on servers 12 that form as endpoints for respective tunnels) communication is encrypted. However, even in such techniques, communication that does not need to be encrypted is forced to execute on servers 12A-12N that provide the enhanced encryption.

The techniques described in this disclosure allow for a user scalable and definable security policy that allows a user (e.g., administrator 24) to define security policies that SDN controller 23 exposes to orchestration engine 22 that enable orchestration engine 22 to select computing devices as target hosts for launching particular virtualized application workloads based on the level of encryption required by those application workloads including, for example, the security characteristics (i.e., level of encryption) of the network tunnels spanning the switch fabric and terminated by those servers. Moreover, as described herein, this may provide certain technical advantages in that the orchestration engine 22 is to identify and utilize host servers 12 for instantiating application workloads so as to select host servers 12 that provide direct connectivity for the necessary tunnels managed and configured by SDN controller 23 across the switch fabric 14 of the data center 10A. In this manner, rather than requiring all communication to be encrypted or all communication being output by a server to be encrypted, orchestration engine 22 selects computing devices on which the application workloads execute such that communication that requires encryption is encrypted, and other communications are not encrypted, or at least not encrypted to at a higher encryption level.

In the above examples, orchestration engine 22 may select a computing device (e.g., one of servers 12A-12X) response to a request to launch a virtualized application workload to ensure that the virtualized application workload is deployed to a computing device that is in a zone defined in the security policy for communicating via a tunnel configured to carry encrypted communication. However, the example techniques are not so limited.

In some examples, virtualized application workloads may be moved between servers 12. For instance, server 12A, on one of its VMs, is executing a virtualized application workload. Server 12A stops executing the virtualized application workload, and server 12B beings re-executing of the virtualized application workload, possibly from where server 12A stopped, on one of its VMs. The process of a virtualized application workload switching servers is referred to as a virtualized application workload being in "vmotion." In this example, it is possible that server 12B may not be in a zone assigned by SDN controller 23 as having tunnels configured to carry encrypted communication. Accordingly, if a virtualized application workload is in vmotion, orchestration engine 22 or possibly some other unit (e.g., a policy agent of a server) performs one or more of the example techniques described in this disclosure to ensure that the virtualized application workload is deployed on a computing device that is included in one of the zones defined the security policy for communicating via at least one tunnel configured to carry encrypted communication.

In some examples, tags indicating whether a particular type of a virtualized application workload needed encrypted communication could change after the virtualized application workload is deployed (e.g., launched). For example, a tag for a particular type of a virtualized application workload may indicate that the virtualized application workload does not require encrypted communication. After being deployed and launched, administrator 24 changes the tag to indicate that virtualized application workloads of that type require encrypted communication. SDN controller 23 may distribute information to each of the policy agents of servers 12, and the policy agent of the server 12 that is executing the virtualized application may output an alarm indicating if its associated server 12 is not in a zone that supports encrypted communications. If SDN controller 23 receives such an alarm, SDN controller 23 may expose the security policy to orchestration engine 22 so that orchestration engine 22 can select one of servers 12 that is in a zone having tunnels configured to carry encrypted communication.

Figure 2:
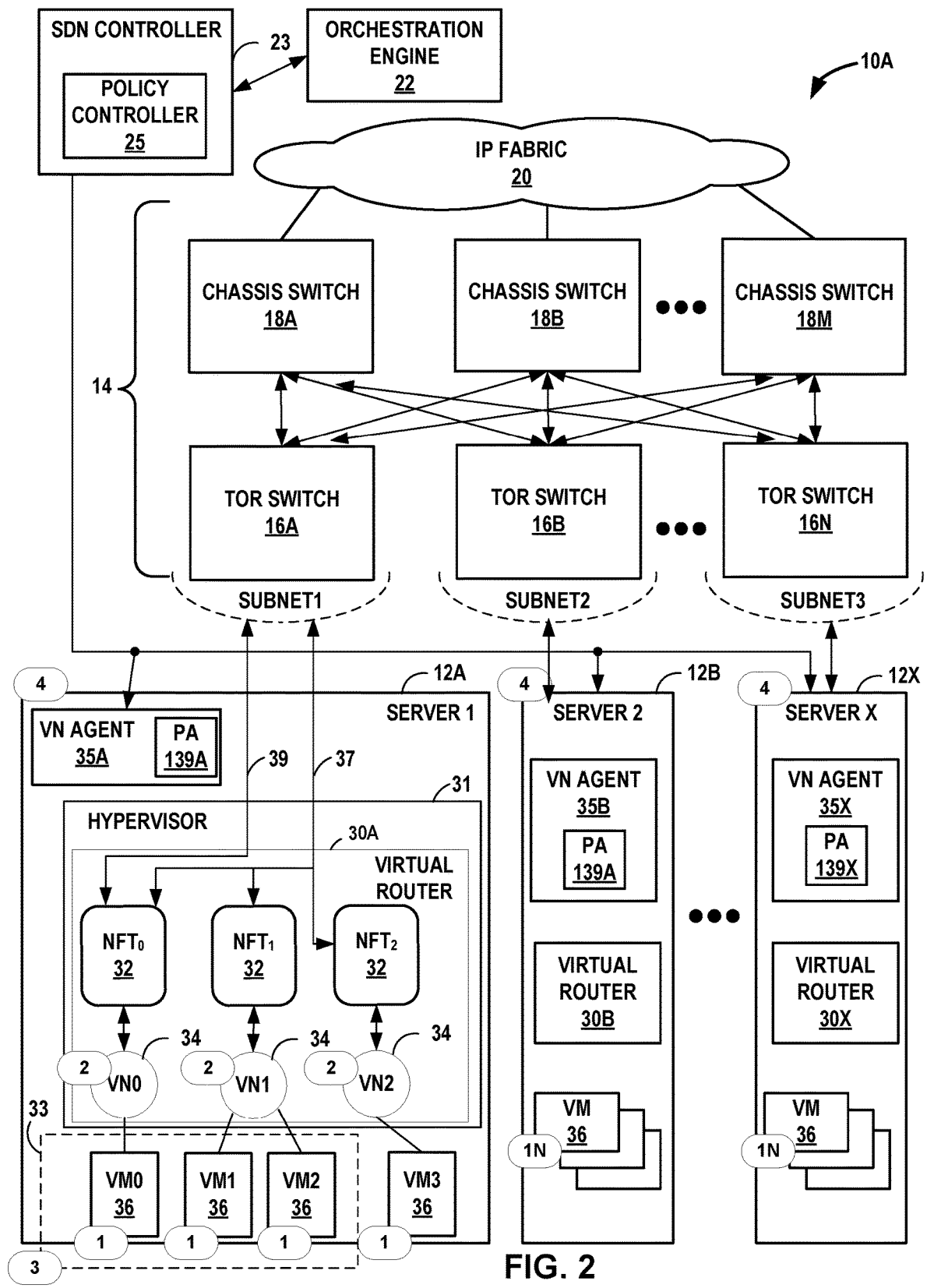
FIG. 2 is a block diagram illustrating an example implementation of the data center of FIG. 1 in further detail.

FIG. 2 is a block diagram illustrating an example implementation of data center 10A of FIG. 1 in further detail. In the example of FIG. 2, data center 10A includes interconnections that extend switch fabric 14 from physical switches 16, 18 to software or "virtual" switches 30A-30X (collectively, "virtual routers 30"). Virtual routers 30 dynamically create and manage one or more virtual networks 34 usable for communication between application instances. In one example, virtual routers 30 execute the virtual network as an overlay network, which provides the capability to decouple an application's virtual address from a physical address (e.g., IP address) of the one of servers 12A-12X ("servers 12") on which the application is executing. Each virtual network may use its own addressing and security scheme and may be viewed as orthogonal from the physical network and its addressing scheme. Various techniques may be used to transport packets within and across virtual networks 34 over the physical network. In some examples, the techniques described in this disclosure provide multicast service within virtual networks 34 without requiring multicast support in the underlying physical network.

Each virtual router 30 may execute within a hypervisor, a host operating system or other component of each of servers 12. Each of servers 12 may represent an x86 or other general-purpose or special-purpose server capable of executing virtual machines 36. In the example of FIG. 2, virtual router 30A executes within hypervisor 31, also often referred to as a virtual machine manager (VMM), which provides a virtualization platform that allows multiple operating systems to concurrently run on one of servers 12. In the example of FIG. 2, virtual router 30A manages virtual networks 34, each of which provides a network environment for execution of one or more virtual machines (VMs) 36 on top of the virtualization platform provided by hypervisor 31. Each VM 36 is associated with one of the virtual networks VN0-VN1 and may represent tenant VMs running customer applications such as Web servers, database servers, enterprise applications, or hosting virtualized services used to create service chains. In some cases, any one or more of servers 12 or another computing device may host customer applications directly, i.e., not as virtual machines. In some cases, some of VMs 36 may represent containers, another form of virtualized execution environment. That is, both virtual machines and container are examples of virtualized execution environments for executing application workloads.

In general, each VM 36 may be any type of software application and may be assigned a virtual address for use within a corresponding virtual network 34, where each of the virtual networks may be a different virtual subnet provided by virtual router 30A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIG. 1 or 2.

In one implementation, each of servers 12 includes a corresponding one of virtual network (VN) agents 35A-35X (collectively, "VN agents 35") that controls virtual networks 34 and that coordinates the routing of data packets within server 12. In general, each VN agent 35 communicates with virtual SDN controller 23, which generates commands to control routing of packets through data center 10A. VN agents 35 may operate as a proxy for control plane messages between virtual machines 36 and SDN controller 23. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing. In accordance with the techniques of the disclosure, each VN agent 35 further includes a respective policy agent 139A-139X (collectively, policy agents 139") for applying one or more policies to one or more categories, as will described in more detail below.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10A to create one or more tunnels for interconnecting servers 12. Besides IPinIP, other example tunneling protocols that may be used include IP over GRE, VxLAN, MPLS over GRE, MPLS over UDP, etc.

As noted above, SDN controller 23 provides a logically centralized controller for facilitating operation of one or more virtual networks within data center 10A. SDN controller 23 may, for example, maintain a routing information base, e.g., one or more routing tables that store routing information for the physical network as well as one or more networks of data center 10A. Similarly, switches 16, 18 and virtual routers 30 maintain routing information, such as one or more routing and/or forwarding tables. In one example implementation, virtual router 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

In one or more examples, SDN controller 23 further includes policy controller 25. Policy controller 25 is configured to tag a plurality of objects across a plurality of levels. In some examples, the plurality of levels include a level of an object, such as a global environment level, a project level, a virtual network level, a virtual machine level, or an interface level of the object. In further examples, policy controller 25 tags the plurality of objects across a plurality of categories. In some examples, the plurality of categories include applications executing within VMs 36, deployments, application tiers, geographic sites, virtual networks, VMs 36, interfaces, projects, security requirements, quality requirements, users, or compliance requirements.

In some examples, policy controller 25 further distributes, to respective policy agents 139 of VN agents 35, a plurality of policies. Each policy of the plurality of policies includes one or more policy rules for controlling network traffic. Each policy rule of the plurality of policy rules specifies one or more tags, each tag further specifying one or more dimensions of the categories.

Upon receiving the plurality of policies, each policy agent 139 applies the one or more policy rules of each of the plurality of policies to tagged objects corresponding to tags of the one or more policy rules to control network traffic between the tagged objects. For example, policy agents 139 under the direction of policy controller 25 express the one or more policy rules at logical interfaces of VMs 36 that are tagged with tags corresponding to tags of the one or more policy rules. Policy agents 139 permit or block network traffic to and/or from the logical interfaces based on the one or more policy rules.

As an illustration of the above, in the example of FIG. 2, policy agent 139A under the direction of policy controller 25 has tagged virtual machines VM0 36, VM1 36, VM2 36, and VM3 36 as belonging to a category described by tag 1. Further, policy agent 139A has categorized virtual networks VN0 34, VN1 34, and VN2 34 in a category described by tag 2, respectively. Furthermore, virtual machines VM0 36, VM1 36, and VM2 36 belong to a first project 33, which policy agent 139A has categorized as belonging to a category described by tag 3. Still further, policy agent 139A has categorized server 1 12A as belonging to a category described by tag 4.

In some examples, the one or more policy rules describe security or firewall rules, and based on the one or more security or firewall rules, each policy agent 139 may allow or deny network traffic between categories described by the one or more tags. Furthermore, each policy agent 139 may encrypt or not encrypt network traffic (e.g., communication) based on the tags. In other examples, each of the one or more policy rules describe one or more firewall, network, application, or global policy rules. Thus, by applying the policies as described herein, policy agents 139 may apply specific policy rules so as to enable application workloads with specific dimensions. Accordingly, the techniques of the disclosure may allow for scalable deployment of policies across different environments within a plurality of data centers 10. Further, the techniques of the disclosure may reduce the complexity and simplify management of such policies within the plurality of data centers 10.

As one example of a security policy, policy controller 25 may define which types of application workloads require enhanced-encrypted communication. One way in which policy controller 25 may define such a security policy is calling out the tags of types of application workloads, and indicating that types of application workloads having a particular tag is to receive or transmit enhanced-encrypted communication. Examples of data structures of security policies are described in more detail below. Policy controller 25 may distribute the security policy that indicates which types of application workloads require enhanced-encrypted communications to policy agents 139 that then ensure that the security policy is implemented on respective ones of servers 12.

For instance, server 12A may belong to a category described by tag 4, as described above and illustrated in FIG. 2. In some examples, tag 4 may indicate that a particular one of servers 12 is an encryption-enhanced computing device. Orchestration engine 22 may access data designating one or more of servers 12 as encryption-enhanced computing devices (e.g., access data that indicates which ones of servers 12 belong to a category described by tag 4). Based on data indicating which ones of servers 12 are encryption-enhanced computing devices and based on the security policy that indicates which ones of the application workloads are required to receive and/or transmit encrypted communication, orchestration engine 22 may select one or more servers 12 on which the application workloads are to execute. Respective ones of policy agents 139 may cause servers 12 to perform the enhanced encryption prior to sending communication to an executing application workload, or perform the enhanced encryption on a communication generated by the application workload based on the security policy distributed by policy controller 25.

In this way, policy agent 139A of server 12A receives a security policy, distributed by policy controller 25, that indicates that communications with an application workload of a plurality of application workloads require encryption. As described above, sever 12A is an example of a computing device that is one of a plurality of computing devices, interconnected with a network, that each provides an execution environment for a plurality of application workloads. In this example, server 12A is designated as an encryption-enhanced computing device.

In some examples, policies are "inherited" in that policies applied to parent objects are likewise applied to objects that are children of the parent objects in a hierarchical fashion. As one example, policy agent 139A receives a first policy rule that includes tag 3 that is applied to project 33. Policy agent 139A applies the first policy rule to project 33. Policy agent 139A further applies the first policy rule to children of the first project, such as virtual networks, virtual machines, and interfaces within the first project, but not to virtual networks, virtual machines, and interfaces within a second project, so as to permit or deny network traffic to the first project and objects within the first project as specified by the first policy rule. In the example of FIG. 2, policy agent 139A applies the first policy rule to virtual machines VM0 36, VM1 36, and VM2 36 because virtual machines VM0 36, VM1 36, and VM2 36 are children of project 33. However, policy agent 139A does not apply the first policy rule to virtual machine VM3 36, which is not part of project 33.

Continuing the forgoing example, policy agent 139A receives a second policy rule that includes tag 1 that describes virtual machines 36. Policy agent 139A therefore applies both the first policy rule and the second policy rule to virtual machines VM0 36, VM1 36, and VM2 36. Further, policy agent 139A applies both the first policy rule and the second policy rule to interfaces of virtual machines VM0 36, VM1 36, and VM2 36 (not depicted), which are children objects of virtual machines 36. However, policy agent 139A does not apply the second policy rule to project 33 because project 33 is a parent, not a child, of virtual machines VM0 36, VM1 36, and VM2 36.

In some examples of the techniques of the disclosure, the policy framework implements complex regular expressions to apply tags for such policies to specific environments or infrastructure. For example, such policy rules include tag expressions to group and/or segment workloads. As a further example, policy agent 139A applies a match condition to match the tag expressions with tagged objects corresponding to the tag expressions. Thus, global policies may be distributed to a plurality of policy agents 139, and each policy agent 139 may selectively apply only those policy rules that include tag expressions that correspond to tagged objects.

In some examples, policy controller 25 distributes one or more policy rules via Border Gateway Protocol (BGP). Such a BGP message may include an action for a particular traffic flow, such as allowing or denying the flow and a list of one or more destination protocols and ports for application of the specified action. In such an example, the BGP message may further specify one or more tags for an object as an extended community for BGP. Additional information with respect to BGP is described in "BGP MPLS-Based Ethernet VPN," RFC 7432, Internet Engineering Task Force (IETF), February 2015, available at https://tools.ietf.org/html/rfc7432, the entire contents of which is incorporated herein by reference.

In one or more examples, subsequent to receiving the security policy, policy agents 139 are each configured to determine whether communications with application workloads executing on respective computing devices include communications with the application workload indicated in the security policy. For example, policy agent 139A may compare tags of application workloads executing on server 12A to tags indicated in the security policy for the application workloads. If the tags match, policy agent 139A determines that the application workload is indicated in the security policy, and ensures that server 12A follows the security policy (e.g., by encrypting communication). If the tags do not match, policy agent 139A determines that this particular security policy does not impact the communication with the application workload.

Figure 3:
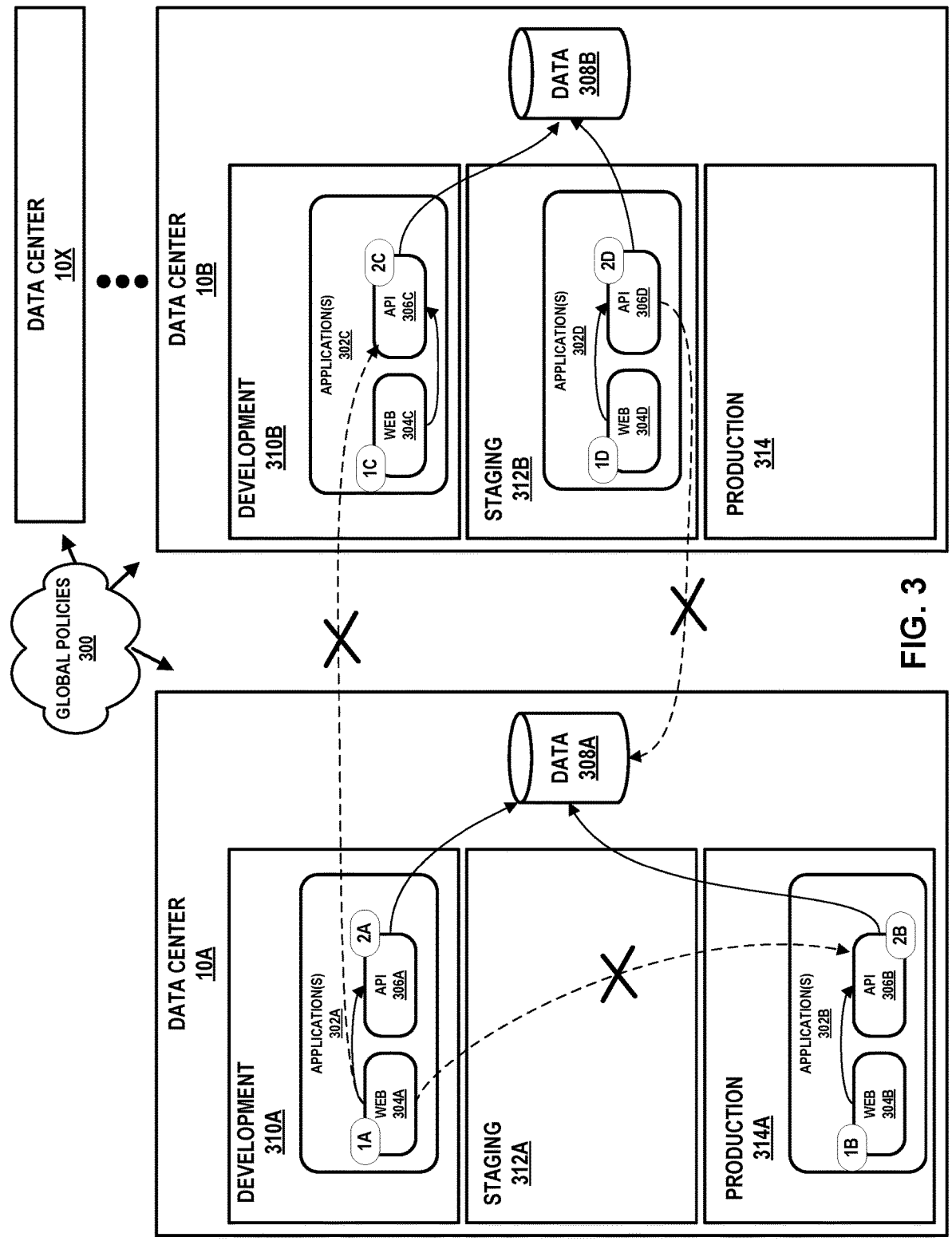
FIG. 3 is a block diagram illustrating an example of a plurality of data centers in which examples of the techniques described herein may be implemented.

FIG. 3 is a block diagram illustrating an example of a plurality of data centers 10 in which examples of the techniques described herein may be implemented. Each of data centers 10A-10X (collectively "datacenters 10") may operate in a substantially similar fashion to datacenters 10 of FIG. 1 and FIG. 2. In some examples, one or more of datacenters 10 implements a cloud environment executing Openstack, while in another example, one or more of data centers 10 is a cloud environment executing Kubernetes, while in yet another example, one or more of data centers 10 implements a cloud environment executing Amazon Web Services, while in yet another example, one or more of data centers 10 executes on "bare metal" infrastructure. In some examples, each of data centers 10 executes a different infrastructure than each other data center 10.

In the example of FIG. 3, each data centers 10 comprises a database 308 and three different environments: a development environment 310, a staging environment 312, and a production environment 314. Each environment of each data center 10 is capable of executing one or more applications 302A-302D (collectively, "applications 302"), such as application 302A executing within development environment 310A of data center 10A, application 302B executing within production environment 314A of data center 10A, application 302C executing within development environment 310B of data center 10B, and application 302D executing within staging environment 312B of data center 10B. In one example, each application 302 is an instance of a finance application. Policies as described herein are robust and extensible for application in many different types of cloud environments described above.

Within an environment, each application may include a plurality of applications. In the example of FIG. 3, application 302A of development environment 310A executes web process 304A and Application Program Interface (API) process 306A. Further, application 302B of production environment 314A executes web process 304B and API process 306B. Application 302C of development environment 310B executes web process 304C and API process 306C. Still further, application 302D of staging environment 312B executes web process 304D and API process 306D. However, in other examples, each application 302 of a respective environment 310A, 312A, 314A, 310B, 312B, or 314B may execute additional or different processes than each other application 302. Furthermore, in some examples, the applications executed within each respective environment 310A, 310B, 312A, 312B, 314A, and 314B may be similar or different from the applications executed within each other environment 310A, 310B, 312A, 312B, 314A, and 314B.

It may be desirable to ensure that processes 304, 306 of each application 302 of a respective environment 310, 312, 314 does not exchange network traffic with processes 304, 306 of an application 302 within a different environment 310, 312, 314, while still permitting network traffic to flow between different processes 304, 306 within the same application 302. For example, an administrator may desire to allow network traffic between web process 304A and API process 306A because each of web process 304A and API process 306A operate within the same application 302A within development environment 310A. Further, the administrator may desire to prevent network traffic between web process 304A (e.g., operating within development environment 310A of data center 10A) and API process 306B (e.g., operating within production environment 314A of data center 10A) or between web process 304A (e.g., operating within development environment 310A of data center 10A) and API process 306C (e.g., operating within development environment 310B of data center 10B). Further, an administrator may desire to permit processes 304, 306 executing within an application 302 within the same data center 10 to access the same database 308, regardless of the specific environment 310, 312, or 314 within which the particular application 302 executes. For example, an administrator may desire to allow API process 306A executing within application 302A and API process 306B executing within application 302B to each access database 308A.

If the administrator were to independently manage network traffic policies for each process 304, 306 within each application 302 within each environment 310, 312, and 314 within each data center 10, the administrator may have difficulty ensuring that each network traffic policy meets security, reliability, and quality requirements. Furthermore, upgrading one or more of the policies across multiple data centers 10 may become cumbersome or unmanageable.

In accordance with the techniques of the disclosure, one or more tags specifying one or more categories are applied to each process 304, 306. As depicted in the example of FIG. 3, policy controller 25 of VNC 22 applies tag "1A" to web process 304A, which specifies that web process 304A belongs to development environment 310A. Similarly, policy controller 25 applies tag "2A" to API process 306A, which specifies that web process 304A belongs to development environment 310A. In contrast, policy controller 25 applies tag "1B" to web process 304B and tag "2B" to API process 306B, each of which specify that the respective application belongs to production environment 314A. Furthermore, tag "1C" is applied to web process 304C and tag "2C" is applied API process 306C, each of which specify that the respective application belongs to development environment 310B; and tag "1D" is applied to web process 304D and tag "2D" is applied to API process 306D, each of which specify that the respective application belongs to staging environment 312B.

In some examples, policy controller 25 may specify security policies that indicate which ones of processes 304 and 306 require encrypted communication. As one example, policy controller 35 may define a security policy that indicates that communication from web 304A to API 306A does not need to be encrypted, but communication from API 306A to data base 308A is to be encrypted. In this example, the security policy may indicate that applications having tag 2A are to output communication with enhanced-encryption, and that applications having tag 1A do not need to output communication with enhanced-encryption.

In one example, a policy agent 139 of a VN agent 35 receives, from policy controller 25, one or more policies specifying one or more policy rules for allowing or blocking network traffic to and from applications 302, or for encrypting communications using enhanced-encryption or not using enhanced-encryption. Each of the one or more policy rules specify one or more tags, each of the tags specifying one or more categories for application of the policy rules. Policy agent 139 applies, to each process 304, 306 of each application 302, only those policy rules that include tags matching tags applied to respective processes 304, 306.

For example, policy agent 139 may receive a first policy rule that permits network traffic destined for API process 306B and includes tag 1B. Policy agent 139 may examine tags for each of processes 304, 306, but apply the policy rule only to web process 304B because web process 304B is categorized within the same category as specified by tag 1B. VN agent 35 may subsequently permit network traffic flowing from an interface of a virtual machine executing web process 304B to an interface of a virtual machine executing API process 306B and block other traffic flowing to the interface of the virtual machine executing API process 306B, such as traffic flowing from an interface of a virtual machine executing web process 304A.

Similarly, policy agent 139 may receive a second policy rule that permits network traffic destined for database 308A and includes tags 2A and 2B. Policy agent 139 may examine categories applied to each of processes 304, 306. Policy agent 139 applies the policy rule only to API processes 306A and 306B because API processes 306A and 306B are categorized within the same category as specified by tags 2A and 2B, respectively. VN agent 35 may subsequently permit network traffic flowing from either an interface of a virtual machine executing API process 306A or the interface of the virtual machine executing API process 306B to an interface of database 308A and block other traffic flowing to the interface of database 308A, such as traffic flowing from a virtual machine executing API process 306D.

As depicted in the foregoing example, the second policy rule may specify tags 2A and 2B in a Boolean expression, e.g., (2A OR 2B). However, in accordance with the techniques of the disclosure, each policy rule may further include complex regular expressions that specify tags for one or more objects. For example, a policy rule may include one or more Boolean operators (e.g., AND, OR, NOT), mathematical operators (e.g., addition, subtraction, multiplication, division), bit-shifting operations, matrix operations, text parsing operators, or a combination of any of the foregoing.

As another example, policy agent 139 may receive a third policy rule that indicates that communications from API 306A (e.g., application workload having tag 2A) are to be encrypted before storage in database 308A. In this example, policy agent 139 may cause the respective one of servers 12A-12N, on which policy agent 139 is executing, to encrypt the communication, using enhanced encryption, that API 306A outputs, and store the encrypted communication in database 308A.

In the foregoing examples, policy agent 139 implements whitelisting, in that all traffic between designated interfaces of virtual machines is preemptively blocked, and the one or more policy rules whitelist specific traffic flows (e.g., specify specific traffic flows between interfaces of virtual machines that are permitted). In alternate examples, policy agent 139 implements blacklisting, in that all traffic between interfaces of virtual machines is preemptively allowed, and the one or more policy rules blacklist specific traffic flows (e.g., specify specific traffic flows between interfaces of virtual machines that are blocked). In alternate examples, the one or more policy rules may include a combination of whitelisting or blacklisting specific traffic flows or groups of traffic flows between interfaces of virtual machines.

In the example of FIG. 3, policy agent 139 is depicted as receiving, from policy controller 25, tags specifying the specific environments to which processes 304, 306 belong. However, in other examples, policy agent 139 may receive tags that specify other categories for organizing processes 304, 306. For example, tags for processes 304, 306 may additionally, or alternatively, specify one or more application types, deployments, application tiers, geographic sites, virtual networks, virtual machines, interfaces, projects, security requirements, quality requirements, users, or compliance requirements.

For example, one or more of data centers 10 implements a cloud environment executing OpenStack. In this example, the cloud environment supports three projects, each providing a finance application comprising three virtual networks. Within such a data center 10, policy controller 25 may assign one or more tags at a project level. For example, policy controller 25 may assign a tag comprising a key of "application" and a value of "finance" and a tag comprising a key of "deployment" and a value of "development" to a first project. Policy controller 25 may assign a tag comprising a key of "application" and a value of "finance" and a tag comprising a key of "deployment" and a value of "staging" to a second project. Policy controller 25 may assign a tag comprising a key of "application" and a value of "finance" and a tag comprising a key of "deployment" and a value of "production" to a third project. Further, within each project, policy controller 25 may assign tags to each of the three virtual networks. For example, policy controller 25 assigns a tag comprising a key of "tier" and a value of "web" to a first virtual network, a tag comprising a key of "tier" and a value of "application" to a second virtual network, and a tag comprising a key of "tier" and a value of "database" to a third virtual network. Moreover, policy controller 25 may assign a key of "computing device" and a value of "enhanced-encryption" to one or more servers 12 that provide enhanced-encryption capabilities. Policy controller 25 may also define a policy rule that indicates which application workloads require encrypted communication. Policy controller 25 distributes one or more policy rules to policy agent 139, which applies the one or more policy rules to interfaces of virtual machines within the data center 10 based on the tags applied to the projects and virtual networks.

In some examples, one or more of data centers 10 is a cloud environment executing Kubernetes. In this example, the cloud environment supports two namespaces, each providing a finance application comprising three virtual networks. Within such a data center 10, policy controller 25 may assign one or more tags at a namespace level. For example, policy controller 25 may assign a tag comprising a key of "application" and a value of "finance," a tag comprising a key of "deployment" and a value of "development," and a tag comprising a key of "site" and a value of "US" to a first namespace. Policy controller 25 may assign a tag comprising a key of "application" and a value of "finance," a tag comprising a key of "deployment" and a value of "production," and a tag comprising a key of "site" and a value of "US" to a second namespace. Further, within each namespace, policy controller 25 may assign tags to each of the three virtual networks. For example, policy controller 25 assigns a tag comprising a key of "tier" and a value of "web" to a first virtual network, a tag comprising a key of "tier" and a value of "application" to a second virtual network, and a tag comprising a key of "tier" and a value of "database" to a third virtual network. Similar to the OpenStack example, for Kubernetes, policy controller 25 may assign a key of "computing device" and a value of "enhanced-encryption" to one or more servers 12 that provide enhanced-encryption capabilities. Policy controller 25 may also define a policy rule that indicates which application workloads require encrypted communication. Policy controller 25 distributes one or more policy rules to policy agent 139, which applies the one or more policy rules to interfaces of virtual machines within the data center 10 based on the tags applied to the projects and virtual networks.

In some examples, a first data center 10A implements a cloud environment executing Amazon Web Services and a second data center 10B executes on "bare metal" infrastructure." In this example, data center 10A supports a first finance application comprising three virtual networks and executing within a development deployment, while data center 10A supports a second finance application comprising three virtual networks and executing within a production deployment. In this example, policy controller 25 may assign one or more tags at an application level. For example, policy controller 25 may assign a tag comprising a key of "application" and a value of "finance," a tag comprising a key of "deployment" and a value of "development," and a tag comprising a key of "site" and a value of "US" to the first application executing within data center 10A. Policy controller 25 may further assign a tag comprising a key of "application" and a value of "finance," a tag comprising a key of "deployment" and a value of "production," and a tag comprising a key of "site" and a value of "US" to the second application executing within data center 10B. Further, within each application, policy controller 25 may assign tags to each of the three virtual networks. For example, policy controller 25 assigns a tag comprising a key of "tier" and a value of "web" to a first virtual network, a tag comprising a key of "tier" and a value of "application" to a second virtual network, and a tag comprising a key of "tier" and a value of "database" to a third virtual network. Policy controller 25 distributes one or more policy rules to policy agent 139, which applies the one or more policy rules to interfaces of virtual machines within the data center 10 based on the tags applied to the projects and virtual networks.

In the example of FIG. 3, policy controller 25 is described as distributing policy rules including tags for objects at a project level. However, policy controller 25 may additionally or alternatively distributing policy rules including tags specifying various different object levels, such as a global environment level, a project level, a virtual network level, a virtual machine level, or an interface level.

In an example implantation of the techniques of the disclosure, policy controller 25 uses a plurality of configuration objects to implement the one or more policies. As one example, policy controller 25 applies a first set of configuration objects at a global level. The first set configuration objects includes global application policy sets, global firewall policies, global firewall rules, and global tags across a plurality of levels and/or categories. Policy controller 25 distributes, to policy agents 139, the first set of configuration objects at the global level. Policy agents 139 match global tags associated with global application policy sets, global firewall policies, and global firewall rules to objects tagged with the global tags. Based on the global application policy sets, global firewall policies, and global firewall rules, policy agents 139 allow or block network traffic between interfaces of the objects tagged with the global tags.

Furthermore, policy controller 25 applies a second set of configuration objects at a project level. The second set of policy rules may include project-specific application policy sets, firewall policies, firewall rules, and tags across a plurality of levels. Policy controller 25 distributes, to policy agents 139, the second set of configuration objects at the project level. Policy agents 139 match project tags associated with project-specific application policy sets, firewall policies, and firewall rules to objects tagged with the project tags. Based on the project-specific application policy sets, firewall policies, and firewall rules, policy agents 139 allow or block network traffic between interfaces of the objects tagged with the project tags.

In further examples, policy controller 25 may specify lower-level configuration objects, such as application policy sets, firewall policies, firewall rules, and tags defined at a virtual network-specific level, a virtual machine-specific level, and/or an interface-specific level. By doing so, policy controller 25 may apply a hierarchical set of policies to a plurality of objects within one or more data centers 10. Thus, the techniques of the disclosure allow for distribution of simplified traffic policies that are scalable and robust across many different types of deployments and execution environments.

Figure 4:
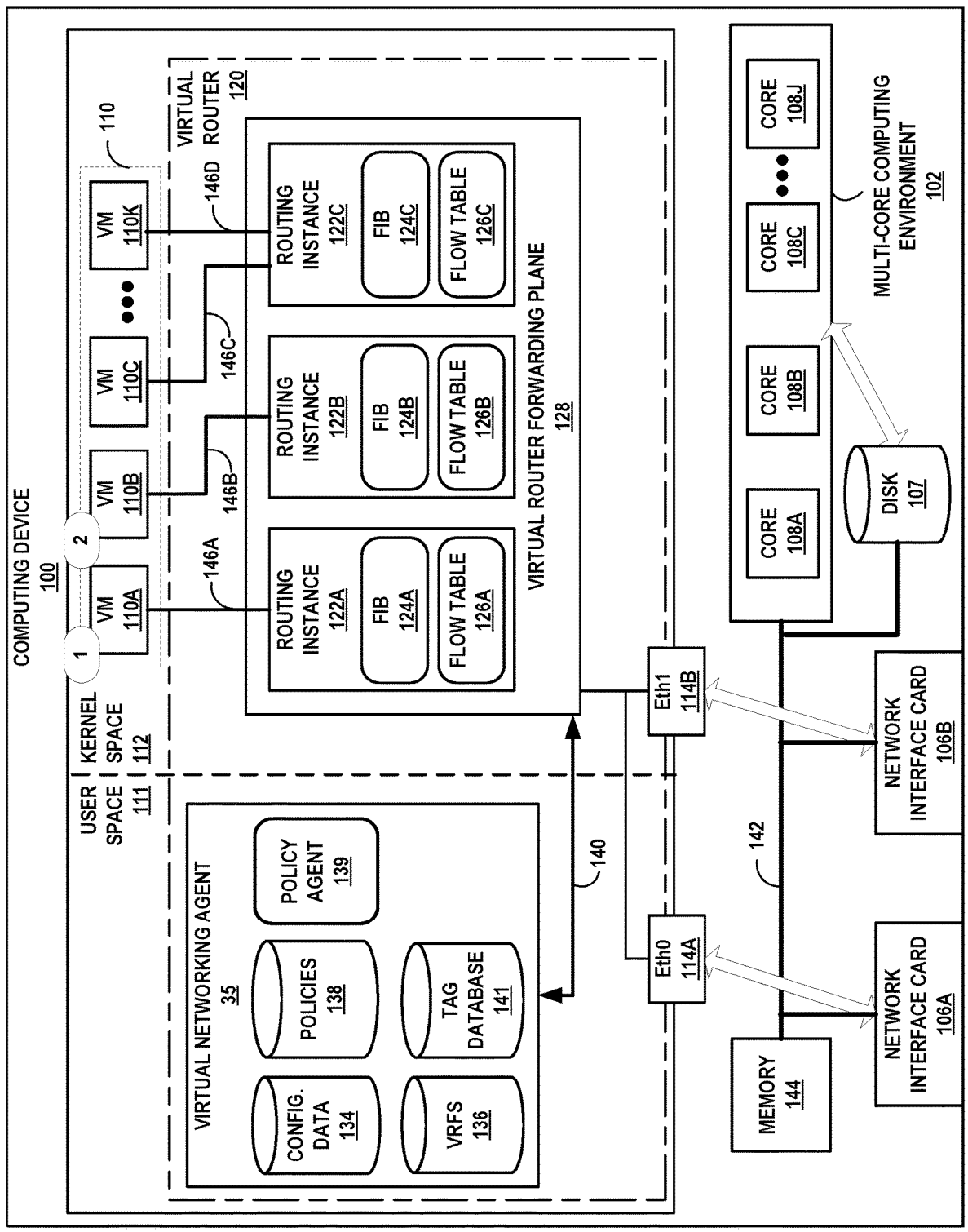
FIG. 4 is a block diagram illustrating a computing device that executes an example virtual router for virtual networks according to techniques described herein.

FIG. 4 is a block diagram illustrating an example computing device 100 that executes a virtual router 120 for virtual networks according to techniques described herein. Computing device 100 may represent any of servers 12 of FIGS. 1-3 or other device, such as any of TOR switches 16.

Computing device 100 includes in this example a system bus 142 coupling hardware components of a computing device 100 hardware environment. System bus 142 couples memory 144, network interface cards (NICs) 106A-106B (collectively, "NICs 106"), storage disk 107, and multi-core computing environment 102 having a plurality of processing cores 108A-108J (collectively, "processing cores 108"). Network interface cards 106 include interfaces configured to exchange packets using links of an underlying physical network. Multi-core computing environment 102 may include any number of processors and any number of hardware cores from, for example, four to thousands. Each of processing cores 108 each includes an independent execution unit to perform instructions that conform to an instruction set architecture for the core. Processing cores 108 may each be implemented as separate integrated circuits (ICs) or may be combined within one or more multi-core processors (or "many-core" processors) that are each implemented using a single IC (i.e., a chip multiprocessor).

Disk 107 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by cores 108.

Main memory 144 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 144 provides a physical address space composed of addressable memory locations.

Memory 144 may in some examples present a non-uniform memory access (NUMA) architecture to multi-core computing environment 102. That is, cores 108 may not have equal memory access time to the various storage media that constitute memory 144. Cores 108 may be configured in some instances to use the portions of memory 144 that offer the lowest memory latency for the cores to reduce overall memory latency.

In some instances, a physical address space for a computer-readable storage medium may be shared among one or more cores 108 (i.e., a shared memory). For example, cores 108A, 108B may be connected via a memory bus (not shown) to one or more DRAM packages, modules, and/or chips (also not shown) that present a physical address space accessible by cores 108A, 108B. While this physical address space may offer the lowest memory access time to cores 108A, 108B of any of portions of memory 144, at least some of the remaining portions of memory 144 may be directly accessible to cores 108A, 108B. One or more of cores 108 may also include an L1/L2/L3 cache or a combination thereof. The respective caches for cores 108 offer the lowest-latency memory access of any of storage media for the cores 108.

Memory 144, network interface cards (NICs) 106A-106B (collectively, "NICs 106"), storage disk 107, and multi-core computing environment 102 provide an operating environment for a software stack that executes a virtual router 120 and one or more virtual machines 110A-110K (collectively, "virtual machines 110"). Virtual machines 110 may represent example instances of any of virtual machines 36 of FIG. 2. The computing device 100 partitions the virtual and/or physical address space provided by main memory 144 and in the case of virtual memory by disk 107 into user space 111, allocated for running user processes, and kernel space 112, which is protected and generally inaccessible by user processes. An operating system kernel (not shown in FIG. 4) may execute in kernel space and may include, for example, a Linux, Berkeley Software Distribution (BSD), another Unix-variant kernel, or a Windows server operating system kernel, available from Microsoft Corp. Computing device 100 may in some instances execute a hypervisor to manage virtual machines 110 (also not shown in FIG. 4). An example hypervisor 31 is illustrated in FIG. 2. Example hypervisors include Kernel-based Virtual Machine (KVM) for the Linux kernel, Xen, ESXi available from VMware, Windows Hyper-V available from Microsoft, and other open-source and proprietary hypervisors. In some examples, specialized hardware programmed with routing information such as FIBs 124 may execute the virtual router 120.

Eth0 114A and Eth1 114B represent devices according to a software device model and provide device driver software routines for handling packets for receipt/transmission by corresponding NICs 106. Packets received by NICs 106 from the underlying physical network fabric for the virtual networks may include an outer header to allow the physical network fabric to tunnel the payload or "inner packet" to a physical network address for one of NICs 106. The outer header may include not only the physical network address but also a virtual network identifier such as a VxLAN tag or Multiprotocol Label Switching (MPLS) label that identifies one of the virtual networks as well as the corresponding routing instance 122. An inner packet includes an inner header having a destination network address that conform to the virtual network addressing space for the virtual network identified by the virtual network identifier. For example, virtual router forwarding plane 128 may receive by Eth1 from NIC 106 a packet having an outer header than includes a VxLAN associated in virtual router forwarding plane 128 with routing instance 122A. The packet may have an inner header having a destination network address that is a destination address of VM 110A that taps, via tap interface 146A, into routing instance 122A.

Virtual router 120 in this example includes a kernel space 112 module: virtual router forwarding plane 128, as well as a user space 111 module: VN agent 35. Virtual router forwarding plane 128 executes the "forwarding plane" or packet forwarding functionality of the virtual router 120 and VN agent 35 executes the "control plane" functionality of the virtual router 120. VN agent 35 may represent an example instance of any of VN agents 35 of FIG. 2.

Virtual router forwarding plane 128 includes multiple routing instances 122A-122C (collectively, "routing instances 122") for corresponding virtual networks. Each of routing instances 122 includes a corresponding one of forwarding information bases (FIBs) 124A-124C (collectively, "FIBs 124") and flow tables 126A-126C (collectively, "flow tables 126"). Although illustrated as separate data structures, flow tables 126 may in some instances be logical tables implemented as a single table or other associative data structure in which entries for respective flow tables 126 are identifiable by the virtual network identifier (e.g., a VRF identifier such as VxLAN tag or MPLS label)). FIBs 124 include lookup tables that map destination addresses to destination next hops. The destination addresses may include layer 3 network prefixes or layer 2 MAC addresses. Flow tables 126 enable application of forwarding policies to flows. Each of flow tables 126 includes flow table entries that each match one or more flows that may traverse virtual router forwarding plane 128 and include a forwarding policy for application to matching flows. For example, virtual router forwarding plane 128 attempts to match packets processed by routing instance 122A to one of the flow table entries of flow table 126A. If a matching flow table entry exists for a given packet, virtual router forwarding plane 128 applies the flow actions specified in a policy to the packet. This may be referred to as "fast-path" packet processing. If a matching flow table entry does not exist for the packet, the packet may represent an initial packet for a new packet flow and virtual router forwarding plane 128 may request VN agent 35 to install a flow table entry in the flow table for the new packet flow. This may be referred to as "slow-path" packet processing for initial packets of packet flows and is represented in FIG. 4 by slow path 140.

In this example, VN agent 35 may be a user space 111 process executed by computing device 100. VN agent 35 includes configuration data 134, virtual routing and forwarding instances configurations 136 ("VRFs 136"), and policy table 138 ("policies 138"). VN agent 35 exchanges control information with one or more virtual network controllers (e.g., VNC 22 of FIGS. 1-2). Control information may include, virtual network routes, low-level configuration state such as routing instances and forwarding policy for installation to configuration data 134, VRFs 136, and policies 138. VN agent 35 may also report analytics state, install forwarding state to FIBs 124 of virtual router forwarding plane 128, discover VMs 110 and attributes thereof. As noted above, VN agent 35 further applies slow-path packet processing for the first (initial) packet of each new flow traversing virtual router forwarding plane 128 and installs corresponding flow entries to flow tables 126 for the new flows for fast path processing by virtual router forwarding plane 128 for subsequent packets of the flows.

VN agent 35 further includes tag database 141. As described above, policy controller 25 of VNC 22 assigns one or more tags specifying one or more levels and/or one or more categories for the objects. Policy controller 25 may apply tags to objects across a plurality of levels or categories, as well as apply the tags to objects across a plurality of data centers. Policy controller 25 distributes these tags to VN agent 35, which stores the assigned tags in tag database 141.

As one example, policy controller 25 may apply tags to each one of computing devices, including computing device 100, that indicate whether that one of the computing devices provides enhanced-encryption. VN agent 35 may store information, in tag database 141, indicating whether its corresponding computing device 100 provides enhanced-encryption. In some examples, VN agent 35 may store information, in tag database 141, for a plurality of computing devices, including all computing devices, that indicates whether the plurality of computing devices provide enhanced-encryption. In this way, policy controller 25 may distribute, in a multi-cast fashion, the tag information to a plurality of computing devices indicating which ones of the computing devices provides enhanced-encryption.

VN agent 35 further includes a policy agent 139. Policy agent 139 receives, from policy controller 25, one or more policies and stores such policies in policies 138. Each of policies 138 may include one or more policy rules that specify whether particular network traffic should be allowed or blocked. In some examples, the policy rules specify which application workloads are required to have encrypted communication.

Each policy rule may include one or more policy tags that specify to which objects, such as types of application workloads executing on VMs 110, the policy rules apply. For example, policy agent 139 may cross reference the one or more tags of a policy rule with one or more tags in tag database 141 to determine one or more objects to which the policy rule should be applied. Upon determining the one or more objects to which the policy rule should be applied, policy agent 139 allows, blocks, or allows but encrypts network traffic originating from or destined to the one or more objects in accordance with the policy rule. In some examples, policy agent 139 allows or blocks network traffic at an interface level of VMs 110. In this example, interfaces 146 inherit tags from parent objects, such as VMs 110, virtual networks, parent projects, or global policy sets. 10. Thus, policy agent 139 allows or blocks network traffic destined for or originating from interfaces 146 of VMs 110 by matching tags of one or more policy rules to tags applied to interfaces 146.

As one example, policy agent 139 receives, from policy controller 25, a first policy rule that permits network traffic originating from interface 146C and includes tag 1. Policy agent 139 may examine categories applied to interfaces 146, determine that a category of interface 146A matches tag 1 of the first policy rule, and apply the policy rule only to interface 146A. VN agent 35 may subsequently permit network traffic originating from interface 146C and destined for interface 146A.

As another example, policy agent 139 receives, from policy controller 25, a second policy rule that blocks network traffic originating from interface 146C and includes tag 2. Policy agent 139 may examine categories applied to interfaces 146, determine that the category of interface 146B matches tag 2 of the second policy rule, and apply the policy rule only to interface 146B. VN agent 35 may subsequently block network traffic originating from interface 146C and destined for interface 146B.

As another example, policy agent 139 receives, from policy controller 25, a third policy rule that indicates that communication to and from a finance application having tag X is to be encrypted. In this example, policy agent 139 may determine whether application having tag X originated the traffic on interface 146C. If the application has the tag X, policy agent 139 may then apply the third policy rule to have the communication from the application encrypted. For instance, policy agent 139 may cause one or more of cores 108 to execute a higher-level encryption algorithm to encrypt the communication.

To update policies for a particular object or group of objects, an administrator may instruct policy controller 25 to distribute new policies to policy agents 139 of respective VN agents 35 of a plurality of data centers 10. In some examples, policy controller 25 distributes the new policies via a BGP message. In this fashion, an administrator may manage a scalable, multi-dimensional policy framework for a plurality of data centers. Further, each policy agent 139 may automatically apply the relevant policies without requiring the administrator to individually manage or update policies for each VN agent 35. Thus, the techniques of the disclosure may greatly reduce the complexity and simplify management of such policies across the plurality of data centers 10.

Figure 5:
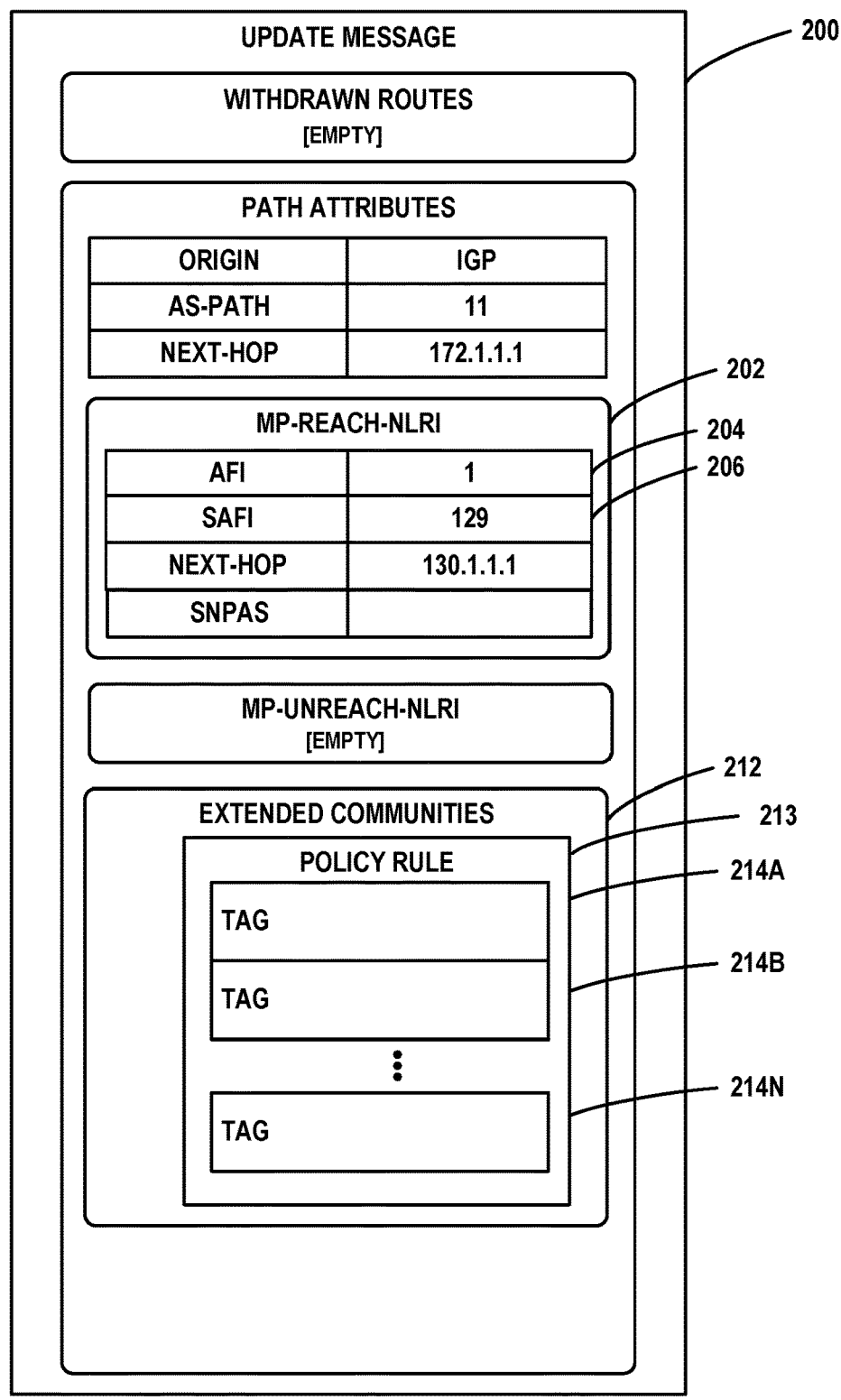
FIG. 5 is a block diagram illustrating an example message that includes tag information in accordance with techniques described herein.

FIG. 5 is a block diagram illustrating an example message that includes tag information in accordance with techniques described herein. Extended BGP UPDATE message 200 conforms to NIP-BGP and includes NIP-REACH-NLRI 202 advertising a route. For purposes of illustration, extended BGP UPDATE message 200 is illustrated using glyphs, rather than with packet fields.

Extended communities attribute 212 includes field 213 that defines one or more policy rules for application to one or more objects specified by fields 214A-214N (collectively, "tag IDs 214"). Tag IDs 214 may be generated during the tag creation. Tag IDs 21, in turn, define one or more tags comprising base key/value pairs which describe categories to which the tagged objects belong. The key/value pairs may be user defined and passed by administrator 24. In some examples, each key of a key/value pair specifies one of an application, a deployment, an application tier, a geographic site, a virtual network, a virtual machine, an interface, a project, a security requirement, a quality requirement, a user, or a compliance requirement, while the corresponding value specifies a descriptor value for the key. For example, a key of a tag ID 214 may describe a particular category, for example, an "application" tier. Further, a value of the tag may express one or more definitions for the category described by the key, for example, a "development" application tier. In other examples, a key may specify a user, a user role, an operating system, a compute node, a rack, a point of distribution, a network cluster, or a data center.

Furthermore, each policy rule 213 may be associated with one or more rulesets for application to traffic among objects described by tag IDs 214. Each ruleset may describe whether to allow, block, or encrypt and allow traffic between the objects described by tags IDs 214. Each ruleset may further describe one or more objects or groups of objects to which each policy rule 213 is applied.

An example schema for policy rule 213 of an extended BGP UPDATE message 200 is provided below:

[Order] [Status] [Action] [Service] [End Point 1] [Direction] [End Point 2] [Match Tags Expression] [Action]

The [Order] field describe the order of application of the policy rule.

The [Status] field indicates to policy agent 139 whether to enable or disable the policy rule. In some examples, the [Status] field is enabled or disabled by an administrator via a user interface of policy agent 139, such as a command-line interface (CLI).

The [Action] field indicates whether to allow, deny, or encrypt and allow traffic that matches objects described by the tags of the policy rule.

The [Service] field may specify a destination protocol, a destination port, or a service group (e.g., a list of ports and protocols) of network traffic to which policy agent 139 should apply the policy rule.

The [End Point 1] and [End Point 2] fields describe objects that share network traffic to which policy agent 139 should apply the policy rule. In some examples, these fields are complex regular expressions that describes multiple objects to which to apply the policy rule. These fields may include information such as a network address prefix, a network address group, a virtual network, one or more expression tags, or a domain name of one or more objects for application of the policy rule.

The [Direction] field may indicate a direction of session initiation for application of the policy rule. Example values for the [Direction] field include ">" (e.g., "left-to-right," sessions where End Point 1 initiates the session with End Point 2), "<" (e.g., "right-to-left," sessions where End Point 2 initiates the session with End Point 1), or "< >" (e.g., "either," sessions where either End Point 1 initiates the session with End Point 2 or End Point 2 initiates the session with End Point 1).

The [Match Tags Expression] field may indicate to policy agent 139 to apply the policy rule to traffic that matches an origin as described with respect to the [End Point 1] field and a destination as described with respect to the [End Point 2] field. In some examples, this action by default matches network traffic within a particular project. In other examples, if a user specifies a match, the default is overridden.

The [Simple Action] field specifies an action to take on network traffic that matches the tags and policy rule. For example, upon determining that network traffic between two or more objects matches the tags specified by the policy rule, the policy rule may specify that policy agent 139 should log the network traffic, reject the network traffic, permit the network traffic, or issue an alert to an administrator.

In accordance with the foregoing example schema for policy rule 213, example policy rules are described below:

Example 1: Allow tcp 80 tier=web>tier=app match deployment && site

In example 1, the policy rule specifies that network traffic that uses TCP protocol on port 80, originates from virtual machine interfaces within a Web tier and is destined for virtual machine interfaces within an Application tier, and that matches both deployment and site tags, should be allowed.

Example 2: Allow tcp 3036 tier=app>tier=db match deployment && site

In example 2, the policy rule specifies that network traffic that uses TCP protocol on port 3036, originates from virtual machine interfaces within an Application tier and is destined for virtual machine interfaces within a Database tier, and that matches both deployment and site tags, should be allowed.

Example 3: Allow any any any>address-group=legacy-svc

In example 3, the policy rule specifies that network traffic that uses any protocol on any port, with any origin and is destined for virtual machine interfaces within a legacy SVC address group, should be allowed.

Example 4: Deny web-service any address-group=blacklist< >any action=log

In example 4, the policy rule specifies that network traffic that uses a web service protocol, originates from addresses within a blacklisted Address Group, and is destined for any virtual machine interface, should be denied. Further, the policy rule specifies that the network traffic should be logged.

Example 5: Encrypt tier=application< >tier=db match finance && site

In example 5, the policy rule specifies that traffic that originates from virtual machine interfaces within an Application tier and is destined for virtual machine interfaces within a Database tier, and that matches both finance and site tags, should be encrypted.

In this way, policy controller 25 may distribute new policies to policy agents 139 of respective VN agents 35 of a plurality of data centers 10 via one or more BGP UPDATE messages 200. Further, policy agents 139 may apply the received policies at the interface level so as to express the policies described by tag IDs 214. In this fashion, an administrator may define simplified traffic policies that are scalable and robust across many different types of deployments and execution environments.

Figure 6:
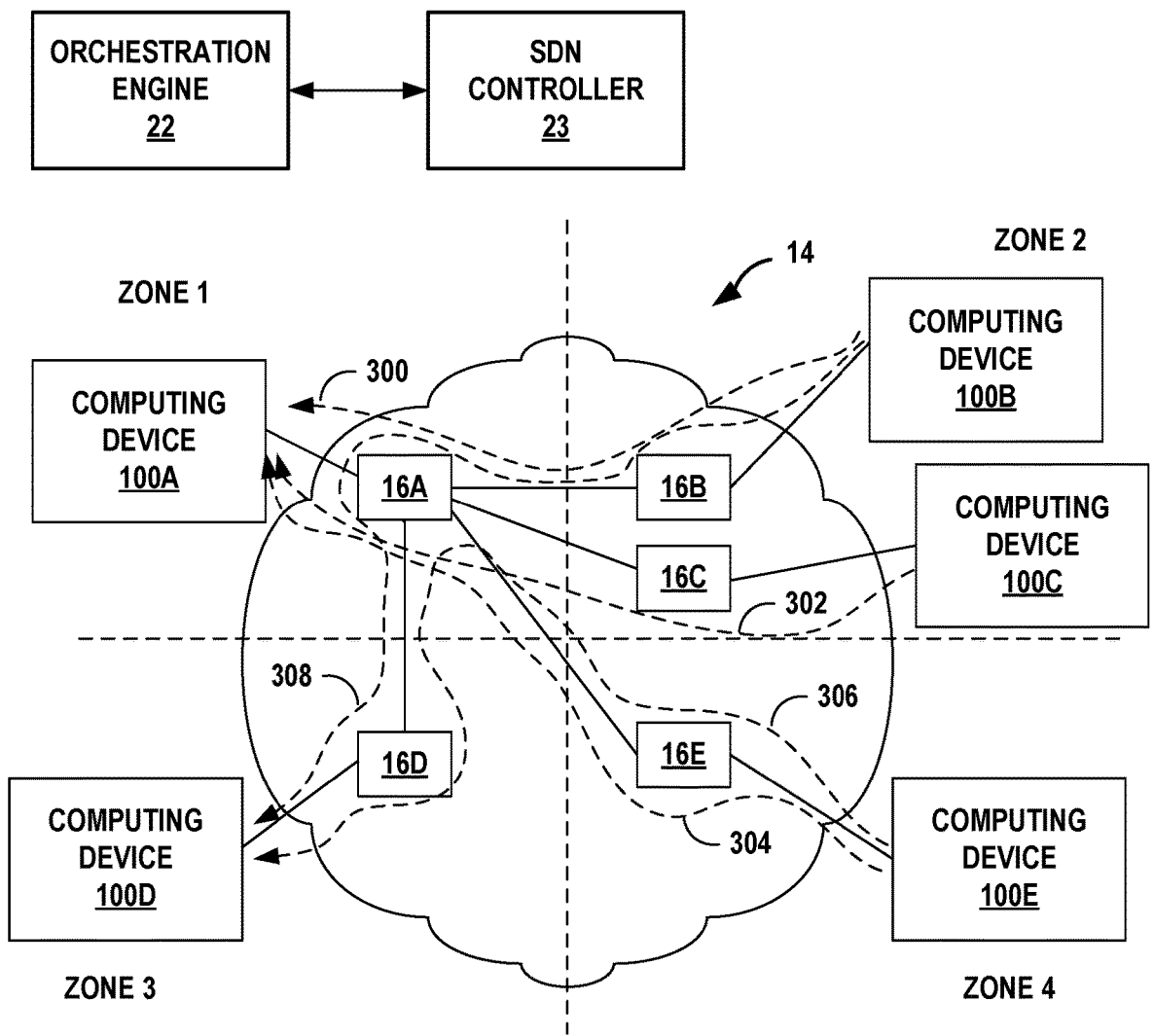
FIG. 6 is a block diagram illustrating an example of tunnels between computing devices.

FIG. 6 is a block diagram illustrating an example of tunnels between computing devices. In the example of FIG. 6, SDN controller 23 may assign computing devices 100A-100E into different encryption zones. For example, the security policy groups computing devices 100A-100E into one or more zones. As illustrated zone 1 includes computing device 100A, zone 2 includes computing devices 100B and 100C, zone 3 includes computing device 100D, and zone 4 includes computing device 100E. In the example of FIG. 6, each one of computing devices 100 is coupled to each other via network 14. For ease of illustration, FIG. 6 is illustrated with each one of computing devices 100 coupled to respective ones of TORs 16, and the TORs 16 are shown as being coupled to one another, but may be coupled through respective ones of chassis switches 18 via IP fabric 20, as illustrated in FIG. 1. Moreover, in some examples, one or more of TORs 16 may be the computing devices.

In accordance with techniques described in this disclosure, SDN controller 23 configures switch fabric 14 to form tunnels between computing devices 100 to implement a security policy. For example, the security policy defines types of virtualized application workloads that require encrypted communication. The security policy may also define zones that include computing devices for communicating via a subset of the tunnels formed by SDN controller 23 that configured to carry encrypted communication. As described above, SDN controller 23 may define tags that identify which ones of computing devices 100 are encryption enhanced computing devices. In some examples, SDN controller 23 forms zones based on the encryption capabilities of computing devices.

As described above, in FIG. 6, SDN controller 23 forms zones 1-4. Zones 1-4 are not necessarily separate physical zones, but rather logical zones used to identify which ones of computing devices 100 are encryption enhanced computing devices 100. For example, computing device 100B and computing device 100E may be physically proximate to one another, and may be physically closer than computing devices 100B and 100C. However, computing devices 100B and 100C are in the same zone (e.g., zone 2), and computing device 100E is in a different zone (e.g., zone 3). In this example, computing devices 100B and 100C are encryption enhanced computing devices, and computing devices 100E is not an encryption enhanced computing device. In this manner, SDN controller 23 assigns a first set of zones (e.g., zone 2) within which encrypted communication is carried in tunnels, described in more detail below, and assigns a second set of zones (e.g., zones 3 and 4) within which other communication (e.g., unencrypted or encrypted but not at the same level as zone 2) is carried in the tunnels.

SDN controller 23 may include information in the security policy that identifies the first set of zones (e.g., zone 2) that includes a first set of computing devices (e.g., computing devices 100B and 100C) in the security policy, and that identifies the second set of zones (e.g., zone 3) that includes a second set of computing devices (e.g., computing device 100D).

FIG. 6 illustrates a plurality of tunnels that SDN controller 23 forms to implement the security policy. For instance, computing devices 100B and 100C form a cluster of computing devices that provide enhanced encryption. As illustrated in FIG. 6, for computing device 100B to transmit encrypted communication to computing device 100B, SDN controller 23 forms tunnel 300, for computing device 100C to transmit encrypted communication to computing device 100A, SDN controller forms tunnel 302, and for computing device 100B to transmit encrypted communication to computing device 100D, SDN controller form tunnel 308. In this example, computing device 100A and computing device 100B each form an endpoint of tunnel 300, computing device 100A and computing device 100C each form an endpoint of tunnel 302, and computing device 100B and computing device 100D each form an endpoint of tunnel 308.

However, not all communication needs to be encrypted. Therefore, SDN controller 23 forms tunnel 304 for computing device 100E to communicate with computing device 100A in a non-encrypted communication, and forms tunnel 306 for computing device 100E to communicate with computing device 100D in a non-encrypted communication. In this example, computing device 100A and computing device 100E each form an endpoint of tunnel 304, and computing device 100D and computing device 100E each form an endpoint of tunnel 306.

In techniques described in this disclosure, the plurality of tunnels may be formed and maintained by SDN controller 23 without access to information of the network, including the tunnels, by orchestration engine 22. Orchestration engine 22 may be configured to access and retrieve (e.g., via execution of a plug-in) the security policy that SDN controller 23 implements. However, orchestration engine 22 may not access or retrieve information indicating which tunnels are formed by SDN controller 23, or which tunnels are capable of carrying encrypted communications.

Responsive to a request to execute a virtualized application workload, orchestration engine 22 accesses the security policy and tags, and selects one of computing devices 100 on which to deploy a virtualized application workload. For instance, orchestration engine 22 may also determine based on the tag that a virtualized application workload to be deployed is of a particular type. Based on the security policy, orchestration engine 22 may determine that the virtualized application workload having the particular type is to output encrypted communication.

Also, from the security policy, orchestration engine 22 may determine which zones defined in the security policy include computing devices for communicating via a subset of all of the tunnels, where the subset of tunnels is configured to carry encrypted communication. From the tags, orchestration engine 22 determines that computing devices 100B and 100C, in zone 2, are encryption enhanced computing devices (e.g., are computing devices in one of the zones defined in the security policy for communicating via at least one tunnel that is configured to carry encrypted communication), and determines that the virtualized application workload should output to a virtualized application workload executing on computing device 100A. Accordingly, orchestration engine 22 selects computing device 100B on which to deploy the virtualized application workload. As illustrated, computing device 100B forms an endpoint for tunnel 300. In one or more examples, orchestration engine 22 may be unaware that computing device 100B forms an endpoint for tunnel 300. From the perspective of orchestration engine 22, computing device 100B provides enhanced encryption, but orchestration engine 22 is unaware of the specific tunnel that computing device 100B will use to transmit the encrypted communication. In this way, orchestration engine 22 may be configured to select the computing device on which the virtualized application workload is to execute without receiving information indicating the tunnel that the selected computing device (e.g., computing device 100B in this example) uses for carrying encrypted communication. SDN controller 23 may be configured to maintain the tunnels through network 14, and select the specific tunnel through which computing device 100B should output the encrypted communication.

Accordingly, in one or more examples, orchestration engine 22 selects computing device 100B on which to deploy the virtualized application workload without selecting a tunnel with which computing device 100B is to communicate (e.g., without receiving information indicating the tunnel the selected computing device uses for carrying encrypted communication). Rather, SDN controller 23 may be configured to select tunnel 300 from the various tunnels with which computing device 100B is to communicate.

In this way, orchestration engine 22 may be able to select which one of computing devices 100 is to execute a virtualized application workload that requires encrypted communication without determining the specific tunnel through which the selected one of computing devices 100 is to transmit or receive the encrypted communication. Therefore, rather than forcing all communication through zone 2 so that all communication between two computing devices 100 is always encrypted, orchestration engine 22 may selectively determine on which computing devices 100 to deploy a virtualized application workload based on the need for encryption, and SDN controller 23 may form and maintain the tunnels to allow the selected computing devices 100 to transmit and receive encrypted communications.

Figure 7:
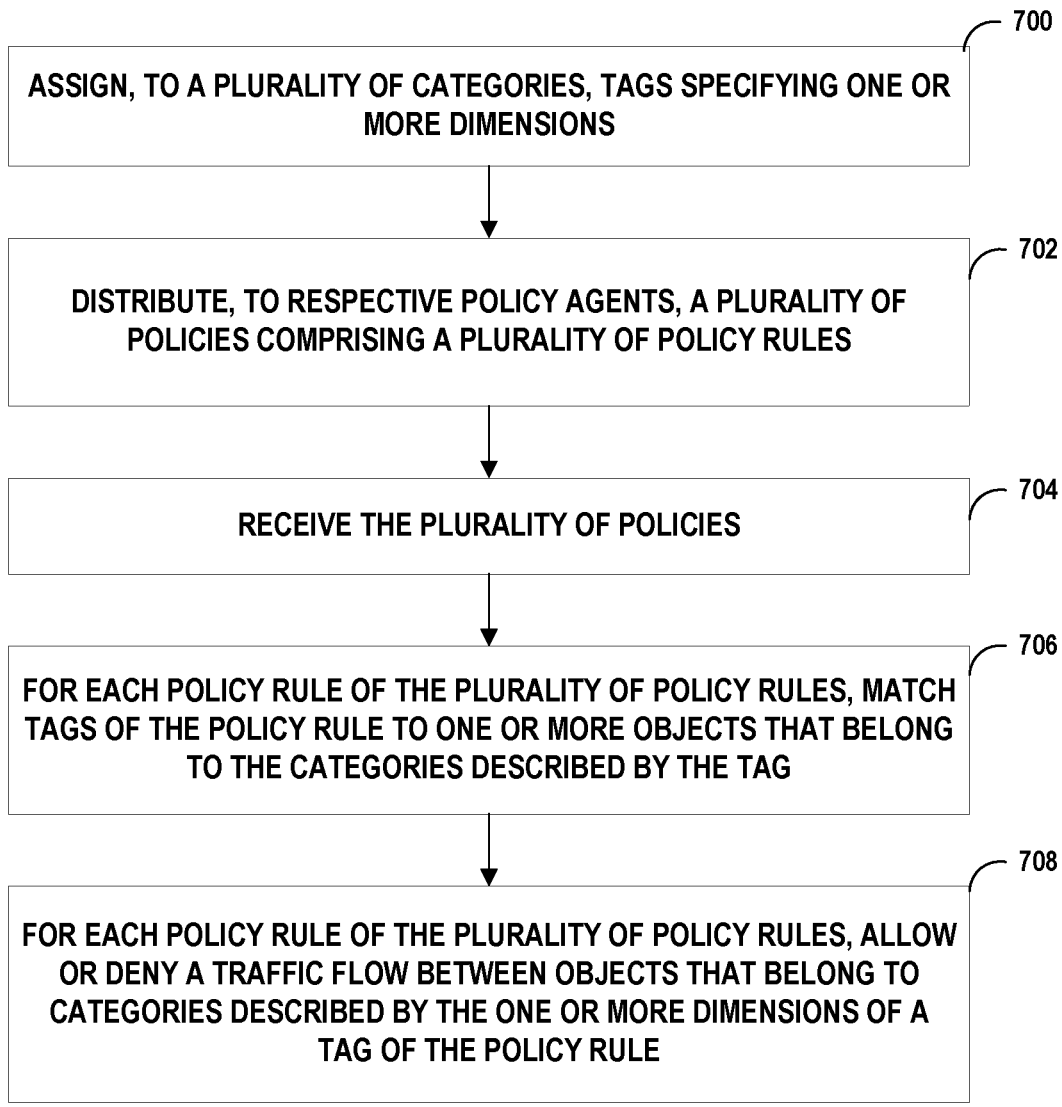
FIG. 7 is a flowchart illustrating an example operation in accordance with the techniques of the disclosure.

FIG. 7 is a flowchart illustrating an example operation in accordance with the techniques of the disclosure. For convenience, FIG. 7 is described with respect to FIGS. 1, 2, and 3.

In the example of FIG. 7, policy controller 23 assigns, to a plurality of categories that support application workloads, tags specifying one or more dimensions of a plurality of dimensions for the application workloads (700). In this example, the application workloads are executed by one or more computing devices, such as servers 12. Further, the one or more computing devices include the plurality of categories. Such categories may include applications, deployments, application tiers, geographic sites, virtual networks, virtual machines, interfaces, projects, security requirements, quality requirements, users, or compliance requirements, for example. Each type of such category represents a dimension for application workloads that generate or consume network traffic. In some examples, policy controller 23 assigns tags to objects that execute or otherwise enable application workloads with specific dimensions across multiple levels. Example levels of such objects include a global environment level, a project level, a virtual network level, a virtual machine level, and an interface level. In one example, tags map security requirements for the objects.

Policy controller 23 distributes, to respective policy agents 139 of plurality of data centers 10, a plurality of policies (702). Each policy of the plurality of policies includes one or more policy rules. Further, each policy rule of the one or more policy rules specifies one or more tags specifying one or more dimensions of the plurality of dimensions.

Policy agent 139A of data center 10A, for example, receives the plurality of policies (704). For each policy rule of the one or more policy rules, policy agent 139A matches each of the one or more tags of each policy rule of the one or more policy rules to one or more objects that belong to the categories of the plurality of categories described by the one or more dimensions of the tag (706). Further, for each policy rule of the one or more policy rules, policy agent 139A allows or denies a traffic flow between objects that belong to categories of the plurality of categories described by the one or more dimensions of a tag of the policy rule (708).

In some examples, policy agent 139 allows or blocks network traffic at an interface level of VMs 110. In this example, interfaces 146 inherit tags from parent objects, such as VMs 110, virtual networks, parent projects, or global policy sets. 10. Thus, policy agent 139 allows or blocks network traffic destined for or originating from interfaces 146 of VMs 110 by matching tags of one or more policy rules to categories to which interfaces 146 belong.

As one example, policy agent 139 receives, from policy controller 23, a first policy rule that permits network traffic originating from interface 146C and includes tag 1. Policy agent 139 may examine categories applied to interfaces 146, determine that interface 146A belongs to a category described by tag 1 of the first policy rule, and apply the policy rule only to interface 146A. VN agent 35 may subsequently permit network traffic originating from interface 146C and destined for interface 146A.

As another example, policy agent 139 receives, from policy controller 23, a second policy rule that blocks network traffic originating from interface 146C and includes tag 2. Policy agent 139 may examine categories applied to interfaces 146, determine that interface 146B belongs to a category described by tag 2 of the second policy rule, and apply the policy rule only to interface 146B. VN agent 35 may subsequently block network traffic originating from interface 146C and destined for interface 146B.

Figure 8:
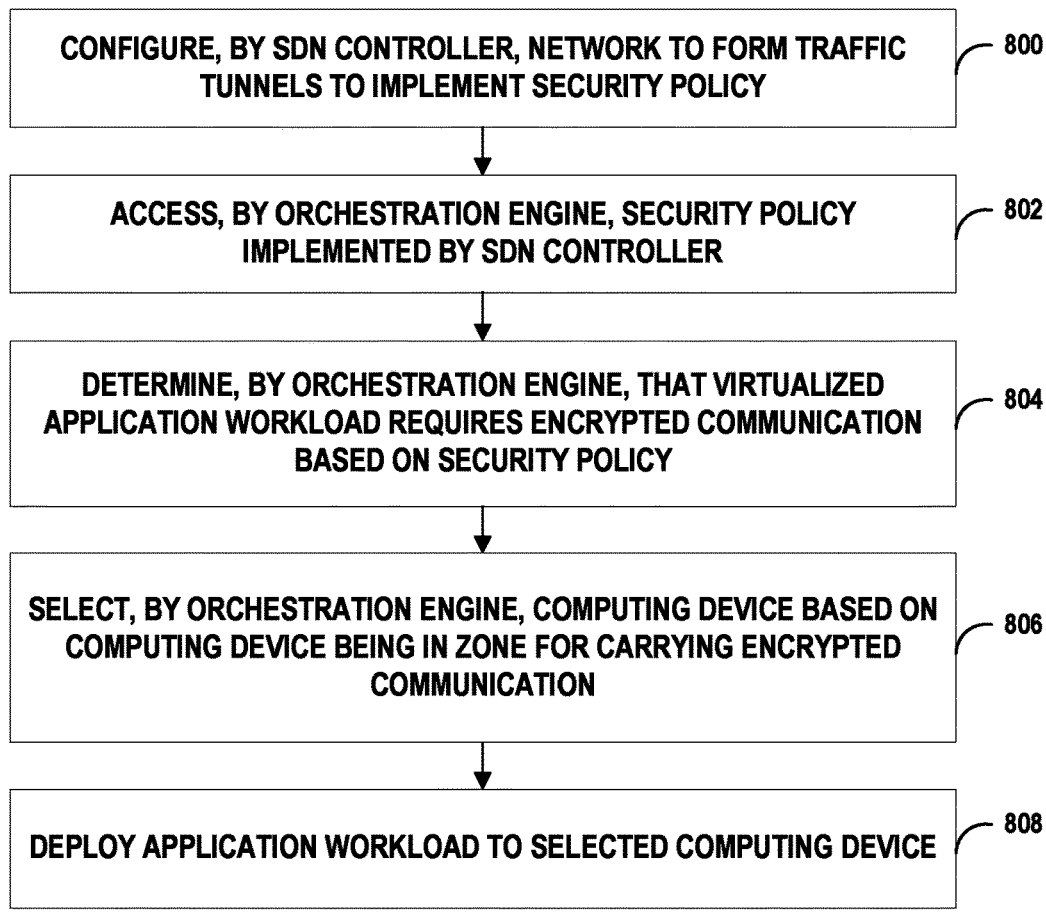
FIG. 8 is a flowchart illustrating an example operation in accordance with the techniques of the disclosure.

FIG. 8 is a flowchart illustrating an example operation in accordance with the techniques of the disclosure. For convenience, FIG. 8 is described with respect to FIGS. 1, 2, and 3.

SDN controller 23 configures a network to form tunnels to implement a security policy (800). For example, as described above, the security policy defines types of virtualized application workloads that require encrypted communication. To implement the security policy, SDN controller 23 may assign security zones each including computing devices that are configured to provide enhanced encryption or are not configured to provide enhanced encryption. SDN controller 23 may further define tunnels between the computing devices in which encrypted communication is to travel.

For example, the security policy defines types of virtualized application workloads that require encrypted communications, and the security policy groups the computing devices into one or more zones that communicate via a respective subset of tunnels, where at least one of the subsets of tunnels is configured to carry encrypted communication. As one example, as part of the configuring of the network, SDN controller 23 may assign a first set of zones (e.g., zone 2) that include a first set of computing devices (e.g., devices 100B and 100C) within which encrypted communication is carried in the tunnels, and assign a second set of zones (e.g., zones 3 and 4) that include a second set of computing devices (e.g., devices 100D and 100E) within which other communication is carried in the tunnels. SDN controller 23 may identify the first set of zones that include the first set of computing devices in the security policy, and identify the second set of zones that include the second set of computing devices in the security policy.

As described above, the computing devices (e.g., severs 12) each provide an execution environment for a plurality of virtualized application workloads for the virtualized application workloads to communicate with the network configured by SDN controller 23. For example, the computing devices form as endpoints to the various tunnels controlled and configured by SDN controller 23. A virtualized application workload executes on a computing device, and the computing devices transmits the communication generated from the execution via the tunnels configured and formed by SDN controller 23.

SDN controller 23 may assign tags to one or more of the plurality of computing devices that designate the one or more of the plurality of computing devices as encryption-enhanced computing devices. Moreover, SDN controller 23 may assign tags to types of the virtualized application workloads that indicate whether respective types of the virtualized application workloads require encrypted communication. In this example, the security policy indicates that communications with the one or more types of the virtualized applications workloads having the tags require encrypted communication.

Responsive to a request to execute a virtualized application workload, orchestration engine 22 accesses a security policy implemented by SDN controller 23 for a plurality of computing devices (802). As one example, orchestration engine 22 executes a plug-in that allows orchestration engine 22 to access information from SDN controller 23. Orchestration engine 22 accesses the security policy with the executed plug-in.

Orchestration engine 22 determines that a virtualized application workload requires encrypted communication based on the security policy (804). As one example, orchestration engine 22 may determine a type of the virtualized application workload that is to be executed, and determine, based on the security policy, that the virtualized application workload that is to be executed belongs to the type for which communication is to be encrypted. For instance, the security policy may be a data structure having a plurality of fields, and one field may indicate a type of application workload, and another field may indicate that application workloads of that type are to have encrypted communication. Orchestration engine 22 may parse the data structure of the security policy to determine that the application workload is of the type identified in the security policy, and that the type identified in the security policy refers to application workloads that require encrypted communication.

Orchestration engine 22 selects a computing device from the computing devices in one of the zones defined in the security policy for communicating via at least one tunnel that is configured to carry encrypted communication (806). As one example, SDN controller 23 assigns tags to one or more of the plurality of computing devices that designate the one or more of the plurality of computing devices that are in zones assigned by SDN controller 23 as being zones for carrying encrypted communication as encryption-enhanced computing devices. In this example, the data designating one or more of the computing devices as encryption-enhanced computing devices includes the tags that designate the one or more of the plurality of computing devices as encryption-enhanced computing devices. Also, orchestration engine 22 selects the computing device based on the tags.

Orchestration engine 22 deploys the application workload to the selected computing device (808). For example, orchestration engine 22 causes the application workload to execute on one or more cores 108 (FIG. 4) of the selected computing device that provides the execution environment for the application workload to communicate with the network configured by SDN controller 23 via a tunnel for communicating encrypted communications.

Figure 9:
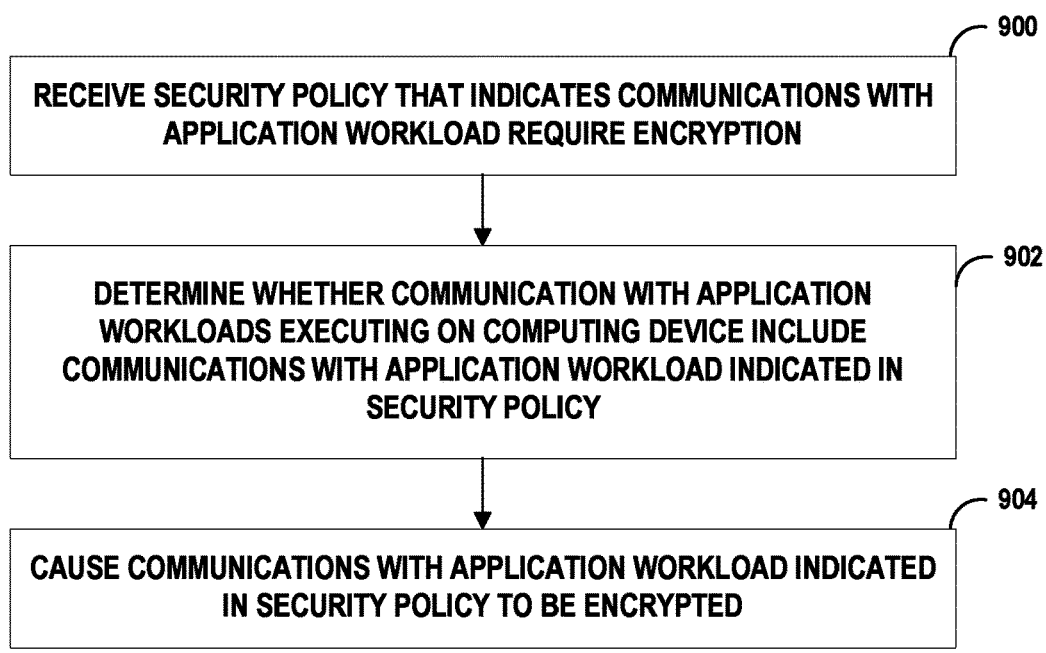
FIG. 9 is a flowchart illustrating an example operation in accordance with the techniques of the disclosure.

FIG. 9 is a flowchart illustrating an example operation in accordance with the techniques of the disclosure. For convenience, FIG. 9 is described with respect to FIGS. 1, 2, and 3. Also, for convenience, FIG. 9 is described with respect to policy agent 139A.

Policy agent 139A receives a security policy that indicates that communications with an application workload require encryption (900). As one example, SDN controller 23 distributes the security policy to each one of policy agents 139.

Subsequent to receiving the security policy, policy agent 139A determines whether communication with application workloads executing on server 12A (which is an example of a computing device) include communications with the application workload indicated in the security policy (902). For example, cores 108 of server 12A execute application workloads. For the application workloads being executed, policy agent 139A may determine whether any of these application workloads are indicated in the security policy. One way in which policy agent 139 may determine whether communication with application workloads executing on server 12A include communications with the application workload indicated in the security policy is by comparing tags of the application workloads to tags indicated in the security policy to determine whether the application workload indicated in the security policy is executing on the computing device.

Policy agent 139A causes communications with the application workload indicated in the security policy to be encrypted based on the determination of whether communication with application workloads executing on server 12A include communications with the application workload indicated in the security policy (904). If the application workload is indicated in the security policy, policy agent 139A may ensure that the communication is encrypted, and if the application workload is not indicated in the security policy, policy agent 139A may not cause the communication to be encrypted. For example, policy agent 139A may ensure that cores 108 execute an higher-level encryption algorithm to encrypt communication with the application workload.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
   configuring, by a software defined networking (SDN) controller, a network to form tunnels between computing devices in accordance with a security policy, wherein the security policy defines one or more types of virtualized application workloads that require encrypted communications and groups each of the computing devices into one of a plurality of zones that communicate via a respective subset of tunnels, wherein at least one of the subsets of the tunnels is configured to carry encrypted communication, wherein each of the computing devices provides an execution environment for a plurality of virtualized application workloads, and wherein configuring the network to form tunnels comprises:
      configuring, by the SDN controller and in accordance with the security policy, a first subset of tunnels to carry encrypted communication and that are coupled to a first set of computing devices included in a first set of zones of the plurality of zones; and
      configuring, by the SDN controller and in accordance with the security policy, a second subset of tunnels to carry other communication and that are coupled to a second set of computing devices included in a second set of zones of the plurality of zones;
   responsive to a request to execute a virtualized application workload, accessing, by an orchestration engine, the security policy implemented by the SDN controller that includes information indicating the first set of zones that include the first set of computing devices;
   determining, by the orchestration engine, that the virtualized application workload requires encrypted communication based on the security policy;
   selecting, by the orchestration engine, a computing device from one of the first set of computing devices in the first set of zones defined in the security policy for communicating via at least one tunnel that is configured to carry encrypted communication; and
   deploying, by the orchestration engine, the application workload to the selected computing device.

2. The method of claim 1,
   wherein configuring the network comprises:
      assigning the first set of computing devices to the first set of zones;
      assigning the second set of computing devices to the second set of zones;
      configuring, by the SDN controller and in accordance with the security policy, the first subset of tunnels between the first set of computing devices assigned to the first set of zones; and
      configuring, by the SDN controller and in accordance with the security policy, the second subset of tunnels between the second set of computing devices assigned to the second set of zones.

3. The method of claim 1, wherein selecting the computing device comprises selecting the computing device without receiving information indicating the at least one tunnel that the selected computing device uses for carrying encrypted communication.

4. The method of claim 1, further comprising:
   selecting, with the SDN controller, the at least one tunnel from the subset of tunnels with which the selected computing device is to communicate.

5. The method of claim 1, further comprising:
   assigning, with the SDN controller, tags to types of the virtualized application workloads that indicate whether respective types of the virtualized application workloads require encrypted communication,
   wherein the security policy indicates that communications with the one or more types of the virtualized application workloads having the tags require encrypted communication.

6. The method of claim 1, further comprising:
   assigning, with the SDN controller, tags to the first set of computing devices that are for communicating via the first subset of tunnels configured to carry encrypted communication,
   wherein selecting the computing device comprises selecting the computing device based on the tags.

7. The method of claim 1, wherein the security policy comprises a data structure having a plurality fields, wherein a first field of the plurality of fields indicates whether encryption is required, and wherein a second field of the plurality of fields indicates a type of one of the plurality of application workloads.

8. The method of claim 1, wherein accessing, by the orchestration engine, the security policy comprises:
   executing a plug-in with the orchestration engine that allows orchestration engine to access information from the SDN controller; and
   accessing the security policy with the executed plug-in.

9. A system comprising:
first processing circuitry comprising or configured to execute a software defined networking (SDN) controller, wherein the SDN controller is configured to configure a network to form tunnels between computing devices in accordance with a security policy, wherein the security policy defines one or more types of virtualized application workloads that require encrypted communications and groups each of the computing devices into one of a plurality of zones that communicate via a respective subset of tunnels, wherein at least one of the subsets of the tunnels is configured to carry encrypted communication, wherein each of the computing devices provides an execution environment for a plurality of virtualized application workloads, and wherein to configure the network to form tunnels, the SDN controller is configured to:
configure, in accordance with the security policy, a first subset of tunnels to carry encrypted communication and that are coupled to a first set of computing devices included in a first set of zones of the plurality of zones; and
configure, in accordance with the security policy, a second subset of tunnels to carry other communication and that are coupled to a second set of computing devices included in a second set of zones of the plurality of zones; and
second processing circuitry comprising or configured to execute an orchestration engine, wherein the orchestration engine is configured to:
access the security policy implemented by the SDN controller that includes information indicating the first set of zones that include the first set of computing devices, responsive to a request to execute a virtualized application workload;
determine that the virtualized application workload requires encrypted communication based on the security policy;
select a computing device from one of the first set of computing devices in the first set of zones defined in the security policy for communicating via at least one tunnel that is configured to carry encrypted communication; and
deploy the application workload to the selected computing device.

10. The system of claim 9,
wherein to configure the network, the SDN controller is configured to:
assign the first set of computing devices to the first set of zones;
assign the second set of computing devices to the second set of zones;
configure, in accordance with the security policy, the first subset of tunnels between the first set of computing devices assigned to the first set of zones; and
configure, in accordance with the security policy, the second subset of tunnels between the second set of computing devices assigned to the second set of zones.

11. The system of claim 9, wherein to select the computing device, the orchestration engine is configured to select the computing device without receiving information indicating the at least one tunnel that the selected computing device uses for carrying encrypted communication.

12. The system of claim 9, wherein the SDN controller is configured to:
select the at least one tunnel from the subset of tunnels with which the selected computing device is to communicate.

13. The system of claim 9, wherein the SDN controller is configured to:
assign tags to types of the virtualized application workloads that indicate whether respective types of the virtualized application workloads require encrypted communication,
wherein the security policy indicates that communications with the one or more types of the virtualized application workloads having the tags require encrypted communication.

14. The system of claim 9, wherein the SDN controller is configured to:
assign tags to the first set of computing devices that are for communicating via the first subset of tunnels configured to carry encrypted communication,
wherein to select the computing device, the orchestration engine is configured to select the computing device based on the tags.

15. The system of claim 9, wherein the security policy comprises a data structure having a plurality fields, wherein a first field of the plurality of fields indicates whether encryption is required, and wherein a second field of the plurality of fields indicates a type of one of the plurality of application workloads.

16. The system of claim 9, wherein to access the security policy, the orchestration engine is configured to:
execute a plug-in with the orchestration engine that allows orchestration engine to access information from the SDN controller; and
access the security policy with the executed plug-in.

* * * * *